(12) United States Patent
Duffield et al.

(10) Patent No.: US 11,665,223 B1
(45) Date of Patent: *May 30, 2023

(54) AUTOMATED NETWORK DISCOVERY FOR INDUSTRIAL CONTROLLER SYSTEMS

(71) Applicant: Samsara Inc., San Francisco, CA (US)

(72) Inventors: James Duffield, San Francisco, CA (US); Paul Ugolini, Canfield, OH (US); Ethan Wen-Yen Chiou, San Francisco, CA (US); Nguyen Trong Dinh, San Francisco, CA (US); James Robert Saunders, San Francisco, CA (US)

(73) Assignee: Samsara Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/660,724

(22) Filed: Apr. 26, 2022

Related U.S. Application Data

(63) Continuation of application No. 16/905,043, filed on Jun. 18, 2020, now Pat. No. 11,349,901, which is a continuation-in-part of application No. 16/789,911, filed on Feb. 13, 2020, now Pat. No. 11,184,422, which is a continuation of application No.
(Continued)

(51) Int. Cl.
| | |
|---|---|
| *G06F 15/167* | (2006.01) |
| *H04L 67/02* | (2022.01) |
| *H04L 41/28* | (2022.01) |
| *H04L 41/0246* | (2022.01) |
| *H04L 41/0806* | (2022.01) |
| *H04L 67/10* | (2022.01) |

(Continued)

(52) U.S. Cl.
CPC .............. *H04L 67/02* (2013.01); *G06F 3/048* (2013.01); *H04L 41/0246* (2013.01); *H04L 41/0806* (2013.01); *H04L 41/28* (2013.01); *H04L 67/10* (2013.01); *H04L 67/1061* (2013.01)

(58) Field of Classification Search
CPC ................. H04L 67/02; H04L 41/0246; H04L 41/0806; G06F 3/048
USPC ........................................................ 709/219
See application file for complete search history.

(56) References Cited

U.S. PATENT DOCUMENTS

| | | | |
|---|---|---|---|
| 6,157,864 A | | 12/2000 | Schwenke et al. |
| 6,282,454 B1 | * | 8/2001 | Papadopoulos ..... H04L 41/0803 700/83 |

(Continued)

OTHER PUBLICATIONS

U.S. Appl. No. 17/451,616, Industrial Controller System and Interactive Graphical User Interfaces Related Thereto, filed Oct. 20, 2021.

(Continued)

*Primary Examiner* — Lan Dai T Truong
(74) *Attorney, Agent, or Firm* — Knobbe, Martens, Olson & Bear, LLP

(57) ABSTRACT

Controller devices may be configured to execute a network discovery service to identify other devices on a network, including other controller devices, user computing devices, and/or human machine interface devices. The controller devices may communicate with the devices on the network. An individual controller device may, upon connection to a human machine interface device, provide to the human machine interface device via a web server, a graphical user interface from which a user may configure the controller device or connect to another controller device on the network.

16 Claims, 27 Drawing Sheets

Related U.S. Application Data

16/557,867, filed on Aug. 30, 2019, now Pat. No. 10,609,114.

(60) Provisional application No. 63/014,370, filed on Apr. 23, 2020, provisional application No. 62/823,920, filed on Mar. 26, 2019.

(51) Int. Cl.
*G06F 3/048* (2013.01)
*H04L 67/1061* (2022.01)

(56) References Cited

U.S. PATENT DOCUMENTS

| | | | |
|---|---|---|---|
| 6,640,140 B1 | 10/2003 | Lindner et al. |
| 6,801,920 B1 | 10/2004 | Wischinski |
| 7,596,417 B2 | 9/2009 | Fister et al. |
| 7,957,936 B2 | 6/2011 | Eryurek et al. |
| 8,973,124 B2 | 3/2015 | Chong et al. |
| 9,230,250 B1 | 1/2016 | Parker et al. |
| 9,445,270 B1 | 9/2016 | Bicket et al. |
| 9,876,909 B1 | 1/2018 | Klein et al. |
| 10,033,706 B2 | 7/2018 | Bicket et al. |
| 10,085,149 B2 | 9/2018 | Bicket et al. |
| 10,102,495 B1 | 10/2018 | Zhang et al. |
| 10,173,486 B1 | 1/2019 | Lee et al. |
| 10,196,071 B1 | 2/2019 | Rowson et al. |
| 10,206,107 B2 | 2/2019 | Bicket et al. |
| 10,388,075 B2 | 8/2019 | Schmirler et al. |
| 10,390,227 B2 | 8/2019 | Bicket et al. |
| 10,444,949 B2 | 10/2019 | Scott et al. |
| 10,564,622 B1 | 2/2020 | Dean et al. |
| 10,579,123 B2 | 3/2020 | Tuan et al. |
| 10,609,114 B1 | 3/2020 | Bicket et al. |
| 10,827,324 B1 | 11/2020 | Hajimiri et al. |
| 10,843,659 B1 | 11/2020 | Innocenzi et al. |
| 11,046,205 B1 | 6/2021 | Govan et al. |
| 11,080,789 B1 | 8/2021 | Guzman et al. |
| 11,122,488 B1 | 9/2021 | Lloyd et al. |
| 11,126,910 B1 | 9/2021 | Akhtar et al. |
| 11,127,130 B1 | 9/2021 | Jain et al. |
| 11,128,130 B2 | 9/2021 | Jain et al. |
| 11,131,986 B1 | 9/2021 | Gal et al. |
| 11,132,853 B1 | 9/2021 | Akhtar et al. |
| 11,137,744 B1 | 10/2021 | Heddleston et al. |
| 11,158,177 B1 | 10/2021 | ElHattab et al. |
| 11,184,422 B1 | 11/2021 | Bicket et al. |
| 11,188,046 B1 | 11/2021 | ElHattab et al. |
| 11,190,373 B1 | 11/2021 | Stevenson et al. |
| 11,341,786 B1 | 5/2022 | Calmer et al. |
| 11,349,901 B1 | 5/2022 | Duffield et al. |
| 11,352,013 B1 | 6/2022 | Srinivasan et al. |
| 11,352,014 B1 | 6/2022 | Srinivasan et al. |
| 11,356,605 B1 | 6/2022 | Shemet et al. |
| 11,356,909 B1 | 6/2022 | Lloyd |
| 11,365,980 B1 | 6/2022 | Akhtar et al. |
| 11,386,325 B1 | 7/2022 | Srinivasan et al. |
| 11,451,610 B1 | 9/2022 | Saunders et al. |
| 11,451,611 B1 | 9/2022 | Saunders et al. |
| 11,479,142 B1 | 10/2022 | Govan et al. |
| 11,522,857 B1 | 12/2022 | Symons et al. |
| 11,558,449 B1 | 1/2023 | Bicket et al. |
| 2002/0169850 A1 | 11/2002 | Batke et al. |
| 2006/0117336 A1 | 6/2006 | Dolgin |
| 2012/0022907 A1 | 1/2012 | Fidlet |
| 2013/0211555 A1 | 8/2013 | Lawson et al. |
| 2013/0211559 A1 | 8/2013 | Lawson et al. |
| 2013/0345829 A1* | 12/2013 | Garg .............. G05B 19/0428 700/9 |
| 2014/0156087 A1 | 6/2014 | Amundson |
| 2014/0180146 A1 | 6/2014 | Nicoli |
| 2014/0328517 A1 | 11/2014 | Gluncic |
| 2014/0337429 A1 | 11/2014 | Asenjo et al. |
| 2015/0077332 A1 | 3/2015 | Fukatsu |
| 2015/0156077 A1 | 6/2015 | Gao et al. |
| 2015/0163561 A1 | 6/2015 | Grevers, Jr. |
| 2016/0349931 A1 | 12/2016 | Walter et al. |
| 2017/0060726 A1 | 3/2017 | Glistvain |
| 2017/0123397 A1 | 5/2017 | Billi et al. |
| 2017/0195265 A1 | 7/2017 | Billi et al. |
| 2017/0227944 A1 | 8/2017 | Goli et al. |
| 2017/0278004 A1 | 9/2017 | McElhinney et al. |
| 2017/0364320 A1 | 12/2017 | Elumalai et al. |
| 2018/0052451 A1 | 2/2018 | Billi-Duran et al. |
| 2018/0077189 A1 | 3/2018 | Doppke et al. |
| 2018/0234514 A1 | 8/2018 | Rajiv et al. |
| 2018/0356800 A1 | 12/2018 | Chao et al. |
| 2018/0357873 A1 | 12/2018 | Rischar et al. |
| 2018/0364686 A1 | 12/2018 | Naidoo et al. |
| 2019/0146435 A1 | 5/2019 | Brandes et al. |
| 2019/0327613 A1 | 10/2019 | Bicket et al. |
| 2020/0120143 A1 | 4/2020 | Nicoll et al. |
| 2020/0150739 A1 | 5/2020 | Tuan et al. |
| 2020/0234334 A1 | 7/2020 | Sarangapurkur et al. |
| 2020/0342230 A1 | 10/2020 | Tsai et al. |
| 2020/0342235 A1 | 10/2020 | Tsai et al. |
| 2020/0342274 A1 | 10/2020 | ElHattab et al. |
| 2020/0342611 A1 | 10/2020 | ElHattab et al. |
| 2020/0344301 A1 | 10/2020 | ElHattab et al. |
| 2021/0006950 A1 | 1/2021 | Hajimiri et al. |
| 2021/0210202 A1 | 7/2021 | Awiszus et al. |

OTHER PUBLICATIONS

U.S. Appl. No. 16/904,982, Remote Asset Monitoring and Control, filed Jun. 18, 2020.
U.S. Appl. No. 16/905,037, Remote Asset Notification, filed Jun. 18, 2020.
U.S. Appl. No. 16/905,043, Automated Network Discovery for Industrial Controller Systems, filed Jun. 18, 2020.
Elias N. Malamas et al. "A survey on industrial vision systems, applications and tools", Sep. 17, 2002, Image and Vision Computing 21, pp. 171-188.
U.S. Appl. No. 17/818,619, Remote Asset Monitoring and Control, filed Aug. 9, 2022.
U.S. Appl. No. 17/818,614, Remote Asset Notification, filed Aug. 9, 2022.

* cited by examiner

INDUSTRIAL ALERTS SETTINGS SUPPORT

Gateways

Search gateways

| DEVICE NAME | ID | PRODUCT | DEPLOYED PROGRAM | DEPLOY DATE | DEPLOY DURATION | ACTIONS |
|---|---|---|---|---|---|---|
| ○ Controller 1 | UBIE-JBN | IG21 | Transfer Line Control | Jan 1, 2019 | 4 days | Details |
| ○ Controller 2 | UREY-378 | IG21 | Tank Controller | Jan 2, 2019 | 2 months | Details |
| ○ Controller 3 | VNM8-3BN | IG21 | Tank Level | Jan 3, 2019 | 2 months | Details |

INDUSTRIAL   ALERTS   SETTINGS   SUPPORT

Deployed Program
Currently Running On   Controller 1                                    Edit — 716

| Name | Author | Deployed Date | Deploy Duration | Status |
|---|---|---|---|---|
| Controller 1 | User 1 | Jan 1, 2019 | 4 days | ○ Deployed |

Code — 712

```
VAR
  digitalInput AT %IX0.0:BOOL;
END_VAR

VAR
  analogInput:BOOL;
  analogOutput:BOOL;
END_VAR

IF(digitalInput) THEN
  IF(analogInput) THEN
    analogOutput:=TRUE;
  ELSE
    analogOutput:=FALSE;
```

Deployed Program History — 714

Programs
○ Pump Handler — Oct 29th, 12:03 PM - Oct 31st, 11:45 AM
○ Pump Handler — Oct 26th, 1:42 PM - Oct 29th, 12:03 PM
○ Water Controller Engine — Oct 18th, 12:58 PM - Oct 26th, 1:42 PM
○ Water Controller Engine — Oct 17th, 7:33 PM - Oct 18th, 12:58 PM Oct 17th, 7:33 PM    Oct 21st, 6:53 AM    Oct 24th, 6:13 PM    Oct 28th, 5:33 AM    Oct 31st, 11:45 AM

INDUSTRIAL  ALERTS  SETTINGS  SUPPORT

All Gateways / Controller 1 Summary

Transfer Line Control

Revisions

| | | By: User 1 |
|---|---|---|
| Transfer Line Control | RUNNING | Jan 1, 10:00AM |
| Transfer Line Control | | Dec 30, 10:00AM |
| Transfer Line Control | | Nov 6th, 1:55PM |
| Transfer Line Control | FORMER | Nov 1st, 11:20PM |
| FORMER | | Oct 31st, 1:30PM |
| FORMER | | Oct 31st, 1:33PM |
| FORMER | | Oct 31st, 1:27PM |
| FORMER | | Oct 31st, 1:24PM |

[Compile]  [Save]  [Deploy] — 724

```
 1. VAR
 2.     digitalInput AT %IX0.0:BOOL;     ← 722
 3. END_VAR
 4.
 5. VAR
 6.     analogInput:BOOL;
 7.     analogOutput:BOOL;
 8. END_VAR
 9.
10.
11. IF(digitalInput) THEN
12. IF(analogInput) THEN
13.     analogOutput:=TRUE;
14. ELSE
15.     analogOutput:=FALSE;
16.
17.
18.
19.
20.
21.
```

INDUSTRIAL  ALERTS  SETTINGS  SUPPORT

New Data Input Alert

Alert if [Tank Level ▾] [rises above ▾] [Fest]

Only alert if this condition holds for more than [   ] minutes.

Avoid these times
[Add Time Range]

Send Contact Notifications
[🔍 Search Contact book] [+ More] [↻ Manage]

Send Webhook Notification
[Select a webhook ▾] [↻ Manage]

[Description (optional)]

☐ Admin only

[Cancel] [Save]

INDUSTRIAL ALERTS SETTINGS SUPPORT

Incidents  Filters: all ▽  🔍 Search

Month ▽  < MAY_JUN 23 22 >  Live

Alerts

Bulk Operations ▽

| ALERT | SOURCE | STATUS | TIME ▽ |
|---|---|---|---|
| ✱ 'Au Pump' is vibrating above 10mm/s for more than 5 minutes. | Au Pump | Resolved after 5 min | Jun21, 11:42 PM |
| ✱ 'Au Pump' is vibrating above 10mm/s for more than 5 minutes. | Au Pump | Resolved after 5 min | Jun21, 9:37 PM |
| ✱ 'Au Pump' is vibrating above 10mm/s for more than 5 minutes. | Au Pump | Resolved after 5 min | Jun21, 9:27 PM |

INDUSTRIAL  ALERTS  SETTINGS  SUPPORT

Configure Data Input

Name
Input Name

Data Input Source
○ Modbus Register  ○ Gateway Channel

Source
Conveyor Control1 - Analog Input 3 (Current) ▽

Tags
Select tags... ▽

Associate Machines
Select Machines ▽

Scale data by...
⦿ Min/max  ○ Formula

Input Min (μA)         Input Max (μA)
4000                   20000

Output Min             Output Max
Minimum output value   Maximum output value ▽

Units
Custom

Custom Units

[Cancel] [Create]

AUTOMATED NETWORK DISCOVERY FOR INDUSTRIAL CONTROLLER SYSTEMS

CROSS-REFERENCE TO RELATED APPLICATIONS

This application is a continuation of U.S. patent application Ser. No. 16/905,043, filed Jun. 18, 2020, and titled "AUTOMATED NETWORK DISCOVERY FOR INDUSTRIAL CONTROLLER SYSTEMS," which application claims benefit of U.S. Provisional Patent Application No. 63/014,370, filed Apr. 23, 2020, and titled "AUTOMATED NETWORK DISCOVERY FOR INDUSTRIAL CONTROLLER SYSTEMS." U.S. patent application Ser. No. 16/905,043 is also a continuation-in-part of U.S. patent application Ser. No. 16/789,911, filed on Feb. 13, 2020, and titled "INDUSTRIAL CONTROLLER SYSTEM AND INTERACTIVE GRAPHICAL USER INTERFACES RELATED THERETO", which application is a continuation of U.S. patent application Ser. No. 16/557,867, filed Aug. 30, 2019, and titled "INDUSTRIAL CONTROLLER SYSTEM AND INTERACTIVE GRAPHICAL USER INTERFACES RELATED THERETO", which application claims benefit of U.S. Provisional Patent Application No. 62/823,920, filed Mar. 26, 2019, and titled "INDUSTRIAL CONTROLLER SYSTEM AND INTERACTIVE GRAPHICAL USER INTERFACES RELATED THERETO". The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

Embodiments of the present disclosure relate to industrial controller devices, sensors, systems, and methods that allow for system automation and data acquisition and processing. Embodiments of the present disclosure further relate to devices, systems, and methods that provide interactive graphical user interfaces for interfacing with and configuring industrial controller devices, sensors, and systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Industrial controller systems, such as standard industrial control systems ("ICS") or programmable automation controllers ("PAC"), may include various types of control equipment used in industrial production, such as supervisory control and data acquisition ("SCADA") systems, distributed control systems ("DCS"), programmable logic controllers ("PLC"), and industrial safety systems. Such systems may be used in industries including electrical, water and wastewater, oil and gas production and refining, chemical, food, pharmaceuticals, robotics, and the like. Using information collected from various types of sensors to measure process variables, automated and/or operator-driven supervisory commands from the industrial controller system can be transmitted to various devices, e.g., actuator devices such as control valves, hydraulic actuators, magnetic actuators, electrical switches, motors, solenoids, and the like. These actuator devices collect data from sensors and sensor systems, open and close valves and breakers, regulate valves and motors, monitor the industrial process for alarm conditions, and so forth.

In general, configuration of industrial controller systems can be time consuming, and unfriendly or impossible for non-technical users. For example, configuration of individual controller devices may require manual interaction with the individual devices, updating firmware (e.g., by inserting memory devices or wired computer interfaces at the individual controller devices) or adjusting settings. Further, in general, gathering data from individual controller devices can be time-consuming and laborious, rendering impossible any real-time or near real-time analyses of such data, including any analyses of data from multiple controller devices. These limitations can make it particularly difficult (or impossible for non-technical users) to deal with situations where a controller device begins to fail, or needs to be updated in view of changes, e.g., to a manufacturing line or process.

SUMMARY

The systems, methods, and devices described herein each have several aspects, no single one of which is solely responsible for its desirable attributes. Without limiting the scope of this disclosure, several non-limiting features will now be described briefly.

Prior industrial control systems may include multiple layers of technology, each of which may be a different physical piece of technology. These layers may include device level measurement sensors, telemetry and control devices (e.g., programmable logic controllers ("PLC") or remote terminal units ("RTU")), connectivity technology (e.g., gateway devices and systems), "historian" devices (e.g., databases and other data management devices), visibility and management devices (e.g., human machine interface ("HMI") devices, manufacturing execution systems ("MES"), and/or supervisory control and data acquisition ("SCADA") systems), and the like. These multiple layers of different technology devices may create significant complexity to implementing, expanding, and updating such prior industrial control systems. For example, identification of and connection to one specific device may be challenging. Individual devices in such networks can be accessed and controlled by HMI devices, but it can be costly to individually pre-configure HMI devices to communicate with particular devices specific to the network being accessed.

Advantageously, various embodiments of the present disclosure may overcome various disadvantages of prior systems and methods. For example, aspects of the present disclosure include a system that grants network access to a wide range of possible devices, by various HMI devices, without each HMI device being uniquely pre-configured for the network. As further examples, embodiments of the present disclosure may include industrial controller devices (also referred to herein as "controller devices") that may include built-in wireless and/or wired communications capabilities, data storage and offloading capabilities, rapid configuration capabilities, and/or additional device control capabilities. The controller devices may automatically establish communication with a remote management server. The controller devices may be remotely and centrally monitored and configured via the management server, e.g., via an interactive graphical user interface accessible from a user computing device. The controller devices may include configuration execution capabilities such that they may operate autonomously based on a current configuration. However, the controller devices may further include automatic offloading of received data to a remote database (e.g., via the management server). Such received data may be useable by the management server for providing further analyses, insights, alerts, etc. to users via interactive graphical user interfaces. The controller devices may provide remote access to live operational data via a web-server operating on the controller devices. Human machine interface devices may communicate with the controller devices via wired or wireless, direct or networked communications. The controller devices may provide interactive graphical user interfaces to such human machine interface devices, enabling synchronization of controller device status at multiple human machine interface devices and/or other user devices. Thus, according to various embodiments of the present disclosure, the controller devices and the management server may replace and streamline the multiple layers of technology of prior systems, while also providing added benefits and functionality over prior systems, and maintaining options for interfacing with and working with prior systems (e.g., existing sensors, PLCs, etc.).

Advantageously, according to various embodiments, the present disclosure may provide a modern platform that may combine data collection, control, alerts, and analytics in an easy to deploy and easy to use system—from the plant floor to remote sites. Embodiments of the present disclosure may enable management of controller devices from a secure cloud dashboard. Embodiments of the present disclosure may provide controller devices that combine the local control and data collection capabilities of a programmable logic controller ("PLC") or remote terminal unit ("RTU"), with a cellular gateway into a single device designed to meet the harsh demands of various industrial environments, including water/wastewater, oil and gas, and the like. Embodiments of the present disclosure may enable out-of-the-box visibility of real-time and historical data, and simple alerting without the hassle of additional software or complexity that may be required in prior systems.

According to various embodiments, the present disclosure includes one or more controller devices that include various configurable input and output ports (which may be configured based on one or more communications specifications and/or configurations of the controller devices), e.g., for interacting with and communicating with various additional systems and devices, e.g., associated with a manufacturing line or process. Data may be collected or received by the controller devices, and may optionally be processed or analyzed by the controller device, based on a configuration of the controller device, e.g., to generate outputs or controls related to various additional systems and devices, e.g., associated with a manufacturing line or process. The controller device may provide outputs in response to received data and/or analysis of the received data, e.g., to stop or adjust the manufacturing line or process, take actions, cause sending of alerts, etc. The controller device may include on-device memory for storing received data and analyses. The controller device may further include additional aspects, including one or more web-servers, for communicating with other devices/systems.

In various embodiments, the controller devices may be configured to automatically connect to a remote management server (e.g., a "cloud"-based management server), and may offload received and analysis data to the remote management server via wired or wireless communications. The controller devices may further communicate with the management server, user computing devices, and/or human machine interface devices, e.g., to provide remote access to the controller device, provide real-time information from the controller device, receive configurations/updates, provide interactive graphical user interfaces, and/or the like.

In various embodiments, the management server may aggregate received data and/or analysis data from one or more controller devices, and provide statuses, alerts, analyses, etc., including via interactive graphical user interfaces that may be accessed via user computing devices. The management server may provide interactive graphical user interfaces through which a user may configure one or more controller devices.

In various embodiments, human machine interface ("HMI") devices may communicate with the controller devices, e.g., via accessing web-servers running on the controller devices that provide interactive graphical user interfaces to the human machine interface devices. Users may thereby configure and/or monitor status of the controller devices via the human machine interface devices. Typically, the human machine interface devices may communicate with the controller devices via a local network (e.g., a network local to, or on-site at, a particular organization).

In various embodiments, the controller devices may communicate with various additional devices, e.g., various components of a manufacturing line or process, sensors, etc. Such communications may be accomplished via one or more application programming interfaces ("APIs").

Accordingly, in various embodiments, large amounts of data may be automatically and dynamically gathered and analyzed in response to user inputs and configurations, and the analyzed data may be efficiently presented to users. Thus, in some embodiments, the systems, devices, configuration capabilities, graphical user interfaces, and the like described herein are more efficient as compared to previous systems, etc.

Further, as described herein, according to various embodiments systems and/or devices may be configured and/or designed to generate graphical user interface data useable for rendering the various interactive graphical user interfaces described. The graphical user interface data may be used by various devices, systems, and/or software programs (for example, a browser program), to render the interactive graphical user interfaces. The interactive graphical user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The present disclosure describes various embodiments of interactive and dynamic graphical user interfaces that are the result of significant development. This non-trivial development has resulted in the graphical user interfaces described herein which may provide significant cognitive and ergonomic efficiencies and advantages over previous systems. The interactive and dynamic graphical user interfaces include improved human-computer interactions that may provide reduced mental workloads, improved decision-making, improved capabilities, reduced work stress, and/or the like, for a user. For example, user interaction with the interactive graphical user interface via the inputs described herein may provide an optimized display of, and interaction with, controller devices, and may enable a user to more quickly and accurately access, navigate, assess, and digest analyses, configurations, received/operational data, and/or the like, than previous systems.

Further, the interactive and dynamic graphical user interfaces described herein are enabled by innovations in efficient interactions between the user interfaces and underlying systems and components. For example, disclosed herein are improved methods of receiving user inputs (including methods of interacting with, and selecting, received data), translation and delivery of those inputs to various system components (e.g., controller devices), automatic and dynamic execution of complex processes in response to the input delivery (e.g., execution of configurations on controller devices), automatic interaction among various components and processes of the system, and automatic and dynamic updating of the user interfaces (to, for example, display the information related to controller devices). The interactions and presentation of data via the interactive graphical user interfaces described herein may accordingly provide cognitive and ergonomic efficiencies and advantages over previous systems.

In various embodiments, the HMI devices include minimal software applications that include a web browser and a network discovery service. Upon connection of a HMI device to a network, the HMI device detects any other devices on the network and connects with a randomly selected first device. In an implementation, the HMI device may specifically detect devices of a certain type, or provided by a particular manufacturer, on the network. Each of the detected devices on the network may be configured with a web server and a network discovery service. Thus, upon the HMI device connecting to a device on the network, the device can provide a web page to be rendered in the browser of the HMI device. The web page can include, for example, various controls and configurations associated with the device and, via the network discovery service of the device, indications of other devices on the network. A user of the HMI device may then control the device, or select a different device to connect to and control that different device. The various devices on the network, aside from the HMI devices, may further include functionality to associate particular HMI devices (e.g., based on the HMI device serial numbers or other unique identifications) with particular devices, such that upon re-connection of an HMI device to the network, an initially connected to device will automatically cause the HMI device to connect to the associated device on the network.

Advantageously, aspects of such an embodiment shift the burden of network device detection and configuration from the HMI device to the network devices (e.g., controller devices). Because the HMI device may not need special processing or configuration capabilities, virtually any user interface display device can be used as an HMI device to access the network and control or configure devices on the network.

Various embodiments of the present disclosure provide improvements to various technologies and technological fields, and practical applications of various technological features and advancements. For example, as described above, some existing systems are limited in various ways, and various embodiments of the present disclosure provide significant improvements over such systems, and practical applications of such improvements. Additionally, various embodiments of the present disclosure are inextricably tied to, and provide practical applications of, computer technology. In particular, various embodiments rely on detection of user inputs via graphical user interfaces, operation and configuration of controller devices, calculation of updates to displayed electronic data based on user inputs, automatic processing of received data, and presentation of updates to displayed data and analyses via interactive graphical user interfaces. Such features and others are intimately tied to, and enabled by, computer and industrial controller technology, and would not exist except for computer and industrial controller technology. For example, the industrial controller functionality and interactions with displayed data described below in reference to various embodiments cannot reasonably be performed by humans alone, without the computer and imaging technology upon which they are implemented. Further, the implementation of the various embodiments of the present disclosure via computer technology enables many of the advantages described herein, including more efficient interaction with, and presentation and analysis of, various types of electronic data, controller device operation and configuration, and the like.

Various combinations of the above and below recited features, embodiments, and aspects are also disclosed and contemplated by the present disclosure.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIGS. 7A-7C illustrate example interactive graphical user interfaces related to controller device configuration, according to various embodiments of the present disclosure.

FIGS. 9A-9C illustrate example interactive graphical user interfaces related to alert generation, according to various embodiments of the present disclosure.

FIGS. 10A-10C illustrate example interactive graphical user interfaces related to controller device configuration, according to various embodiments of the present disclosure.

DETAILED DESCRIPTION

Figure 1:
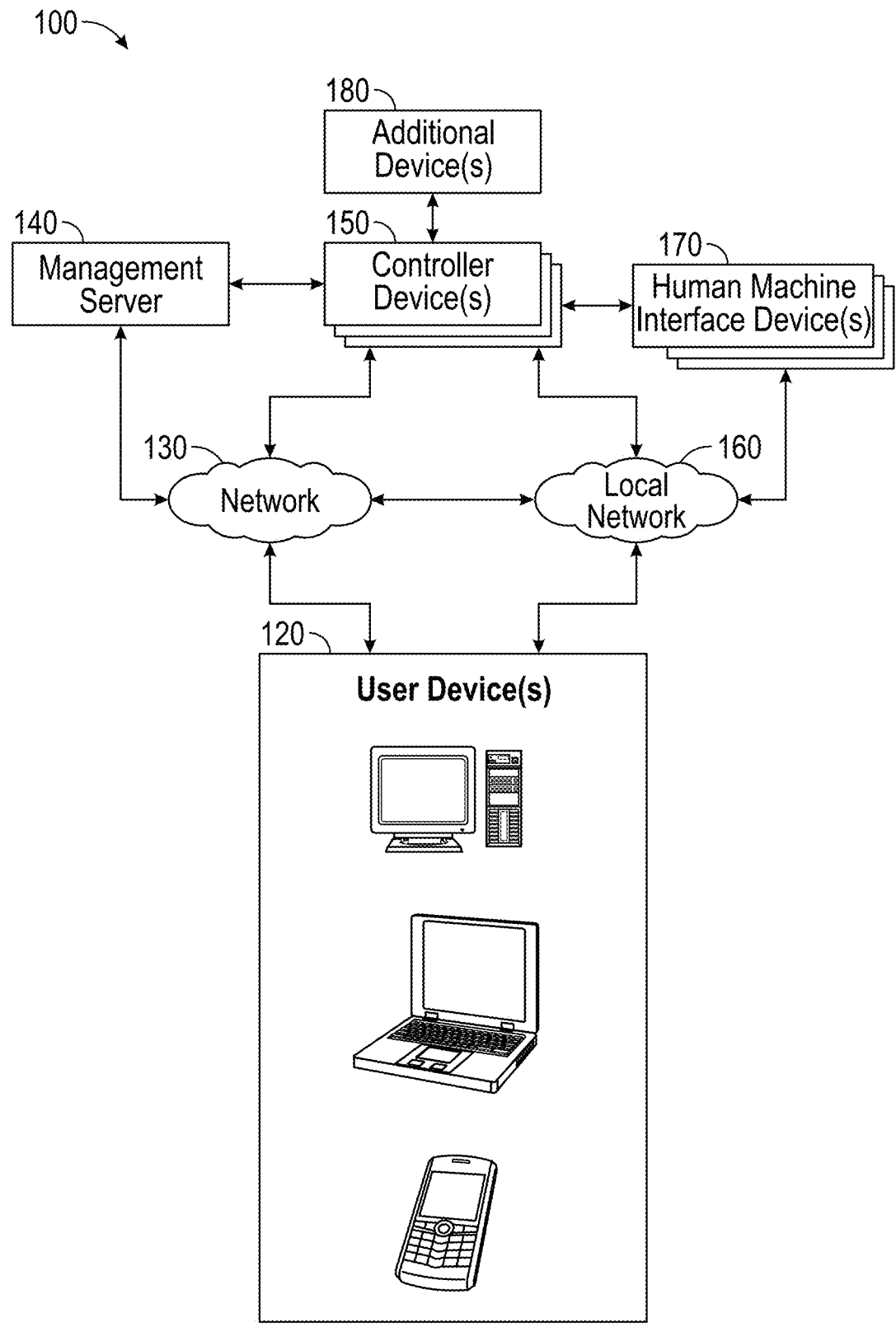
FIG. 1 illustrates a block diagram of an example operating environment in which one or more aspects of the present disclosure may operate, according to various embodiments of the present disclosure.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

I. Overview

As mentioned above, according to various embodiments, the present disclosure includes one or more controller devices that include various configurable input and output ports (which may be configured based on one or more communications specifications and/or configurations of the controller devices), e.g., for interacting with and communicating with various additional systems and devices, e.g., associated with a manufacturing line or process. Data may be collected or received by the controller devices, and may optionally be processed or analyzed by the controller device, based on a configuration of the controller device, e.g., to generate outputs or controls related to various additional systems and devices, e.g., associated with a manufacturing line or process. The controller device may provide outputs in response to received data and/or analysis of the received data, e.g., to stop or adjust the manufacturing line or process, take actions, cause sending of alerts, etc. The controller device may include on-device memory for storing received data and analyses. The controller device may further include additional aspects, including one or more web-servers, for communicating with other devices/systems.

In various embodiments, the controller devices may be configured to automatically connect to a remote management server (e.g., a "cloud"-based management server), and may offload received and analysis data to the remote management server via wired or wireless communications. The controller devices may further communicate with the management server, user computing devices, and/or human machine interface devices, e.g., to provide remote access to the controller device, provide real-time information from the controller device, receive configurations/updates, provide interactive graphical user interfaces, and/or the like.

In various embodiments, the management server may aggregate received data and/or analysis data from one or more controller devices, and provide statuses, alerts, analyses, etc., including via interactive graphical user interfaces that may be accessed via user computing devices. The management server may provide interactive graphical user interfaces through which a user may configure one or more controller devices.

In various embodiments, human machine interface ("HMI") devices may communicate with the controller devices, e.g., via accessing web-servers running on the controller devices that provide interactive graphical user interfaces to the human machine interface devices. Users may thereby configure and/or monitor status of the controller devices via the human machine interface devices. Typically, the human machine interface devices may communicate with the controller devices via a local network (e.g., a network local to, or on-site at, a particular organization.

In various embodiments, the HMI devices include minimal software applications that include a web browser and a network discovery service. Upon connection of a HMI device to a network, the HMI device detects any other devices on the network and connects with a randomly selected first device. In an implementation, the HMI device may specifically detect devices of a certain type, or provided by a particular manufacturer, on the network. Each of the detected devices on the network may be configured with a web server and a network discovery service. Thus, upon the HMI device connecting to a device on the network, the device can provide a web page to be rendered in the browser of the HMI device. The web page can include, for example, various controls and configurations associated with the device and, via the network discovery service of the device, indications of other devices on the network. A user of the HMI device may then control the device, or select a different device to connect to and control that different device. The various devices on the network, aside from the HMI devices, may further include functionality to associate particular HMI devices (e.g., based on the HMI device serial numbers or other unique identifications) with particular devices, such that upon re-connection of an HMI device to the network, an initially connected to device will automatically cause the HMI device to connect to the associated device on the network.

Advantageously, aspects of such an embodiment shift the burden of network device detection and configuration from the HMI device to the network devices (e.g., controller devices). Because the HMI device may not need special processing or configuration capabilities, virtually any user interface display device can be used as an HMI device to access the network and control or configure devices on the network.

In various embodiments, the controller devices may communicate with various additional devices, e.g., various components of a manufacturing line or process, sensors, etc. Such communications may be accomplished via one or more application programming interfaces ("APIs").

Various aspects of the present disclosure may individually and/or collectively provide various technical advantages as described herein, and may overcome various disadvantages of prior art systems and methods. For example, embodiments of the present disclosure may include industrial controller devices (also referred to herein as "controller devices") that may include built-in wireless and/or wired communications capabilities, data storage and offloading capabilities, rapid configuration capabilities, and/or additional device control capabilities. The controller devices may automatically establish communication with a remote management server. The controller devices may be remotely and centrally monitored and configured via the management server, e.g., via an interactive graphical user interface accessible from a user computing device. The controller devices may include configuration execution capabilities such that they may operate autonomously based on a current configuration. However, the controller devices may further include automatic offloading of received data to a remote database (e.g., via the management server). Such received data may be useable by the management server for providing further analyses, insights, alerts, etc. to users via interactive graphical user interfaces. The controller devices may provide remote access to live operational data via a web-server operating on the controller devices. Human machine interface devices may communicate with the controller devices via wired or wireless, direct or networked communications. The controller devices may provide interactive graphical user interfaces to such human machine interface devices, enabling synchronization of controller device status at multiple human machine interface devices and/or other user devices. Thus, according to various embodiments of the present disclosure, the controller devices and the management server may replace and streamline the multiple layers of technology of prior systems, while also providing added benefits and functionality over prior systems, and maintaining options for interfacing with and working with prior systems (e.g., existing sensors, PLCs, etc.).

Advantageously, according to various embodiments, the present disclosure may provide a modern platform that may combine data collection, control, alerts, and analytics in an easy to deploy and easy to use system—from the plant floor to remote sites. Embodiments of the present disclosure may enable management of controller devices from a secure cloud dashboard. Embodiments of the present disclosure may provide controller devices that combine the local control and data collection capabilities of a programmable logic controller ("PLC") or remote terminal unit ("RTU"), with a cellular gateway into a single device designed to meet the harsh demands of various industrial environments, including water/wastewater, oil and gas, and the like. Embodiments of the present disclosure may enable out-of-the-box visibility of real-time and historical data, and simple alerting without the hassle of additional software or complexity that may be required in prior systems.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

II. Terms

In order to facilitate an understanding of the systems and methods discussed herein, a number of terms are defined below. The terms defined below, as well as other terms used herein, should be construed broadly to include the provided definitions, the ordinary and customary meaning of the terms, and/or any other implied meaning for the respective terms. Thus, the definitions below do not limit the meaning of these terms, but only provide example definitions.

User Input (also referred to as "Input"): Any interaction, data, indication, etc., received by a system/device from a user, a representative of a user, an entity associated with a user, and/or any other entity. Inputs may include any interactions that are intended to be received and/or stored by the system/device; to cause the system/device to access and/or store data items; to cause the system to analyze, integrate, and/or otherwise use data items; to cause the system to update to data that is displayed; to cause the system to update a way that data is displayed; and/or the like. Non-limiting examples of user inputs include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (e.g., fist, hand flat, one finger extended, etc.), and/or the like. For example, user inputs may comprise a position, orientation, and/or motion of a hand or other appendage, a body, a 3D mouse, and/or the like.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. Additionally, although the present disclosure may show or describe data as being stored in combined or separate databases, in various embodiments such data may be combined and/or separated in any appropriate way into one or more databases, one or more tables of one or more databases, etc. As used herein, a data source may refer to a table in a relational database, for example.

III. Example Operating Environment

FIG. 1 illustrates a block diagram of an example operating environment 100 in which one or more aspects of the present disclosure may operate, according to various embodiments of the present disclosure. The operating environment 100 may include one or more user devices 120, a management server 140, controller device 150, one or more human machine interface devices 170, and one or more additional devices 180. The various devices may communicate with one another via, e.g., a communications network 130 and/or a local communications network 160, as illustrated.

In general, the controller device 150 comprises a housing including processor(s), memory, input/output ports, etc. that may be affixed to, or positioned near, e.g., an industrial process, a manufacturing line, one or more industrial machines, and/or the like. The controller device 150 provides outputs to, receives inputs from, and otherwise communicates with and/or controls, various additional systems and devices, e.g., associated with an industrial process. In general, the controller device 150 functions based on a configuration of the controller device 150, which may include various communications specifications (e.g., that indicate functionality of the input and output ports), executable program instructions/code, and/or the like. Based on the configuration, the controller device 150 may process or analyze data received via the ports of the controller device 150, and provide outputs or controls, cause sending of alerts, etc., based on the processing/analyses. Configurations of the controller device 150 may include various analysis algorithms, program instructions, scripts, etc., as described herein. Execution of the configuration may be performed on the controller device 150, rather than remotely, to enable rapid responses to the results of analyses of inputs to the controller device 150.

Received data and analysis results/data may be stored in a memory of the controller device 150 (e.g., a computer readable storage medium). The received data and analysis results may also be automatically transmitted from the controller device 150, e.g., to management server 140. The management server 140 may thereby receive data and analysis results from multiple controller devices 150, and may aggregate and perform further analyses on the received data and analysis results from multiple controller devices 150.

The management server 140 may communicate with the controller device(s) 150 to enable remote, rapid configuration of the controller device(s) 150. Such configuration may be accomplished via interactive graphical user interfaces provided by the management server 140 and accessible by the user device(s) 120, for example. Via the management server 140, and/or directly by communication with the controller device(s) 150, user device(s) 120 may access substantially real-time views of status, analysis, etc. of the controller device(s) 150. Communications with the controller device(s) 150 may be accomplished via web-servers executing on the controller devices 150 themselves.

In some embodiments, the features and services provided by the management server 140 may be implemented as web services consumable via the network 130. In further embodiments, the management server 140 is provided by one or more virtual machines implemented in a hosted computing environment. The hosted computing environment may include one or more rapidly provisioned and released computing resources, which computing resources may include computing, networking and/or storage devices.

In general, the optional human machine interface ("HMI") device(s) 170 may be any computing device such as a desktop, laptop or tablet computer, personal computer, tablet computer, wearable computer, server, personal digital assistant (PDA), hybrid PDA/mobile phone, mobile phone, smartphone, set top box, voice command device, digital media player, and the like. A human machine interface device 170 may execute an application (e.g., a browser, a stand-alone application, etc.) that allows a user to access interactive user interfaces, view analyses or aggregated data, and/or the like as described herein. The human machine interface device(s) 170 may communicate with the controller device(s) 150, e.g., via accessing web-servers running on the controller device(s) 150 that provide interactive graphical user interfaces to the human machine interface device(s) 170. Users may thereby configure and/or monitor status of the controller device(s) 150 via the human machine interface device(s) 170. Typically, the human machine interface device(s) 170 may communicate with the controller device(s) 150 via a local network (e.g., a network local to, or on-site at, a particular organization).

The optional additional device(s) 180 may comprise various components of a manufacturing/industrial line or process, sensors, and/or the like. The controller device(s) 150 may communicate with the additional device(s) 180 to receive information from the additional device(s) 180, and/or to provide outputs/controls to the additional device(s) 180. Communications with the additional device(s) 180 may be accomplished via one or more application programming interfaces ("APIs"). Communications with the additional device(s) 180 may also be accomplished via intermediate communications with existing or legacy devices, such as specialized PLCs and/or the like.

Various example user devices 120 are shown in FIG. 1, including a desktop computer, laptop, and a mobile phone, each provided by way of illustration. In general, the user devices 120 can be any computing device such as a desktop, laptop or tablet computer, personal computer, tablet computer, wearable computer, server, personal digital assistant (PDA), hybrid PDA/mobile phone, mobile phone, smartphone, set top box, voice command device, digital media player, and the like. A user device 120 may execute an application (e.g., a browser, a stand-alone application, etc.) that allows a user to access interactive user interfaces, view analyses or aggregated data, and/or the like as described herein. In various embodiments, users may interact with various components of the example operating environment 100 (e.g., the management server 140, the controller device(s) 150, the human machine interface device(s) 170, etc.) via the user device(s) 120. Such interactions may typically be accomplished via interactive graphical user interfaces, however alternatively such interactions may be accomplished via command line, and/or other means.

The network 130 may include any wired network, wireless network, or combination thereof. For example, the network 130 may be a personal area network, local area network, wide area network, over-the-air broadcast network (e.g., for radio or television), cable network, satellite network, cellular telephone network, or combination thereof. As a further example, the network 130 may be a publicly accessible network of linked networks, possibly operated by various distinct parties, such as the Internet. In some embodiments, the network 130 may be a private or semi-private network, such as a corporate or university intranet. The network 130 may include one or more wireless networks, such as a Global System for Mobile Communications (GSM) network, a Code Division Multiple Access (CDMA) network, a Long Term Evolution (LTE) network, or any other type of wireless network. The network 130 can use protocols and components for communicating via the Internet or any of the other aforementioned types of networks. For example, the protocols used by the network 130 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The local network 160 may similarly include any wired network, wireless network, or combination thereof. In general, however, the local network 160 illustrated in FIG. 1 represents a network that may be local to a particular organization, e.g., a private or semi-private network, such as a corporate or university intranet. In some implementations, devices may communicate via the local network 160 without traversing an external network 130 such as the Internet. In some implementations, devices connected via the local network 160 may be walled off from accessing the network 130 (e.g., the Internet), e.g., by a gateway device, unless specifically granted access to the network 130. Accordingly, e.g., the human machine interface device(s) 170 (and/or user device(s) 120) may communicate with the controller device 150 directly (via wired or wireless communications) or via the local network 160, without traversing the network 130. Thus, even if the network 130 is down, or is not currently providing connectivity to the management server 140, the controller device(s) 150 and the human machine interface device(s) 170 (and/or the user device(s) 120) may continue to communicate and function via the local network 160 (or via direct communications).

For example, the network 160 may be a personal area network, local area network, wide area network, over-the-air broadcast network (e.g., for radio or television), cable network, satellite network, cellular telephone network, or combination thereof. As a further example, the network 160 may be a publicly accessible network of linked networks, possibly operated by various distinct parties, such as the Internet.

In some embodiments, the network 160 may be a private or semi-private network, such as a corporate or university intranet. The network 160 may include one or more wireless networks, such as a Global System for Mobile Communications (GSM) network, a Code Division Multiple Access (CDMA) network, a Long Term Evolution (LTE) network, or any other type of wireless network. The network 160 can use protocols and components for communicating via the Internet or any of the other aforementioned types of networks. For example, the protocols used by the network 160 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

In various embodiments, communications among the various components of the example operating environment 100 may be accomplished via any suitable means. For example, the controller device(s) 150 may communicate with one another, the additional device(s) 180, the human machine interface device(s) 170, the management server 140, and/or the user device(s) 120 via any combination of the network 130, the local network 160, or any other wired or wireless communications means or method (e.g., Bluetooth, WiFi, infrared, cellular, etc.).

Further details and examples regarding the implementations, operation, and functionality, including various interactive graphical user interfaces, of the various components of the example operating environment 100 are described herein in reference to various figures.

IV. Example Management Device/Server

Figure 2:
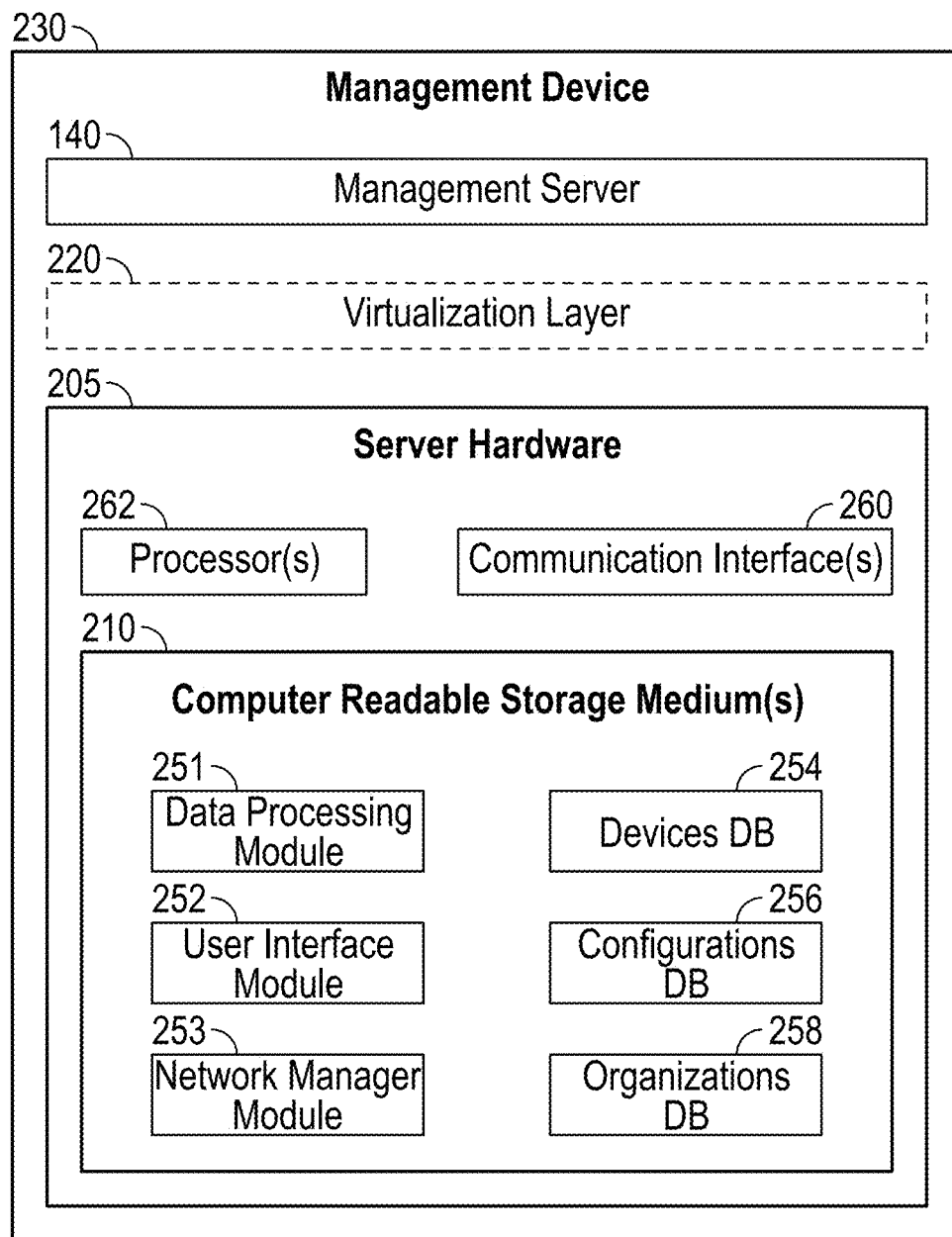
FIG. 2 illustrates a block diagram including an example implementation of a management device, according to various embodiments of the present disclosure.

FIG. 2 illustrates a block diagram including an example implementation of a management device 230, according to various embodiments of the present disclosure. In the example implementation, management device 230 includes management server 140, which management server 140 may be a Web or cloud server, or a cluster of servers, running on one or more sets of server hardware. In an embodiment, the management server 140 works for both single and multi-tenant installations, meaning that multiple organizations with different administrators may have, e.g., multiple controller devices, human machine interface devices, and additional devices managed by the same management server.

According to various embodiments, management server 140 may be implemented on management device 230 (or multiple devices similar to management device 230), which includes server hardware 205. Server hardware 205 includes one or more communication interfaces 260, one or more processors 262, and one or more computer readable storage mediums 210, each of which may be in communication with one another. The computer readable storage medium 210 includes data processing module 251, user interface module 252, network manager module 253, devices database 254, configurations database 256, and organizations database 258. In various implementations, the various databases of the management device 230 may be combined or separated/partitioned as appropriate to implement the functionality described herein, and to maintain security and separation of data, e.g., for different organizations. In various implementations, the various databases may or may not be stored separately from the management device 230.

In various implementations one or more buses, interconnects, wires/cables, etc. may be used to interconnect the various components of the server hardware 205. In various implementations one or more interfaces, APIs, communication layers, buses, interconnects, wires/cables, etc. may be used to interconnect the various components of the management device 230.

In operation, the one or more communication interfaces 260, one or more processors 262, and one or more computer readable storage mediums 210 communicate with one another to, e.g., execute by the processor(s) 262 computer program instructions (e.g., as provided by the user interface module 252); receive, access, and transmit data (e.g., to/from the databases and via the communication interface(s) 260); and/or the like. In general, the server hardware 205 enables the functionality of the management server 140 as described herein. Further implementation details are described below.

In operation, the communication interface(s) 260 may provide wired and/or wireless communications with other devices and networks, as described herein. In various embodiments, communications among the various components of the example operating environment 100 may be accomplished via any suitable means. For example, the management server 140 and/or management device 230 may communicate with the controller device 150, the human machine interface device(s) 170, the additional device(s) 180, and/or the user device(s) 120 via any combination of the network 130, the local network 160, or any other communications means or method (e.g., Bluetooth, WiFi, infrared, cellular, etc.). Accordingly, the communications interface(s) 260 may include one or more of wired and wireless transceivers, such as a Joint Test Action Group (JTAG) transceiver, a Bluetooth or Bluetooth Low Energy (LE) transceiver, an IEEE 802.11 transceiver, an Ethernet transceiver, a USB transceiver, a Thunderbolt transceiver, an infrared transceiver, a wireless cellular telephony transceiver (e.g., 2G, 3G, 4G, 5G), or the like.

In operation, data processing module 251 may provide processing and analysis of data (e.g., data received from the various devices, including the controller devices and/or additional devices) as described herein. The data processing/analysis may usefully provide insights and information that may be provided via various interactive graphical user interfaces, as described herein.

In operation, the user interface module 252 may provide the various interactive graphical user interface functionality described herein. This may include, for example, generating user interface data useable for rendering the various interactive user interfaces described. The user interface data may be used by various computer systems, devices, and/or software programs (for example, a browser program of a user device 120), to render the interactive user interfaces. The interactive user interfaces may be displayed on, for example, electronic displays (including, for example, touch-enabled displays). For example, the user interface module 252 may provide various network accessible interactive graphical user interfaces, e.g., to allow the administrators of the various organizations and devices to create and log into an account associated with an organization to which a set of devices belong (e.g., controller devices and additional devices), and manage, and access data associated with, those devices as described herein.

In operation, the network manager module 253 may provide communication with and configuration and management of the various devices associated with each organization. This may include, for example, receiving and managing information related to the various devices (e.g., controller devices, additional devices, and human machine interface devices) at the time of manufacture, associating devices with particular organizations when they are purchased/claimed and implemented by the organizations (e.g., the claiming may be performed at least in part by populating the devices database 254 and the organizations database 258 with appropriate information when the devices are associated with an organization), receiving data from the various devices (e.g., and storing the data in the devices database 254 or other appropriate database), sending data to various devices (e.g., sending and/or syncing configurations stored in the configurations database 256 to/with various devices), and/or the like.

In operation, the devices database 254 may store information regarding the controller devices 150, human machine interface devices 170, and/or additional devices 180, and various relationships and associations among these devices. This information may include identifiers associated with these devices, data received from these devices, analysis data from these devices, etc.

In operation, the configurations database 256 may store information regarding configurations of the controller devices 150, human machine interface devices 170, and additional devices 180.

In operation, the organizations database 258 may store information regarding the organizations to which the controller devices 150, human machine interface devices 170, and additional devices 180 belong.

In various embodiments, the management server 140, as implemented by the management device 230, may include various other modules, components, engines, etc. to provide the functionality as described herein. It will be appreciated that additional components, not shown, may also be part of the management server 140 and/or the management device 230, and, in certain embodiments, fewer components than that shown in FIG. 2 may also be used in the management server 140 and/or the management device 230. For example, the management server 140 may include a security module used to manage cryptographic keys, certificates, and/or other data associated with establishing secure communication with various other devices. For example, the devices database 254 may include an identifier of each device (e.g., a serial number), a secret to be used to establish a secure communication with the devices of the same organization, and/or a mechanism to authenticate the devices' identity (e.g., the public key of a private public key pair, the private key of which was embedded or stored in the device during the manufacturing, etc.).

While various embodiments do not implement virtualization, alternative embodiments may use different forms of virtualization—represented by a virtualization layer 220 in the management device 230. In these embodiments, the management server 140 and the hardware that executes it form a virtual management server, which is a software instance of the modules and/or databases stored on the computer readable storage medium 210.

For example, in an implementation the management device 230 (or one or more aspects of the management device 230, e.g., the management server 140) may comprise, or be implemented in, a "virtual computing environment". As used herein, the terms "virtual computing environment", "virtualization", "virtual machine", and/or the like should be construed broadly to include, for example, computer readable program instructions executed by one or more processors (e.g., as described below) to implement one or more aspects of the modules and/or functionality described herein. Further, in this implementation, one or more modules/engines/etc. (e.g., user interface module 252) and/or databases of the management device 230 may be understood as comprising one or more rules engines of the virtual computing environment that, in response to inputs received by the virtual computing environment, execute rules and/or other program instructions to modify operation of the virtual computing environment. For example, a request received from the user device(s) 120 may be understood as modifying operation of the virtual computing environment to cause modules to gather data, generate or transmit configurations, generate or transmit user interfaces, etc. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered and/or responses received and analyzed. Initial operation of the virtual computing environment may be understood as an establishment of the virtual computing environment. In some implementations the virtual computing environment may comprise one or more virtual machines, virtualization layers, containers, and/or other types of emulations of computing systems or environments. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the management device 230 as a virtual computing environment may advantageously enable executing different aspects or modules of the system on different computing devices or processors, which may increase the scalability of the system. Implementing one or more aspects of the management device 230 as a virtual computing environment may further advantageously enable sandboxing various aspects, data, or modules of the system from one another, which may increase security of the system by preventing, e.g., malicious intrusion into the system from spreading. Implementing one or more aspects of the management device 230 as a virtual computing environment may further advantageously enable parallel execution of various aspects or modules of the system, which may increase the scalability of the system. Implementing one or more aspects of the management device 230 as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

V. Example Controller Device

Figure 3:
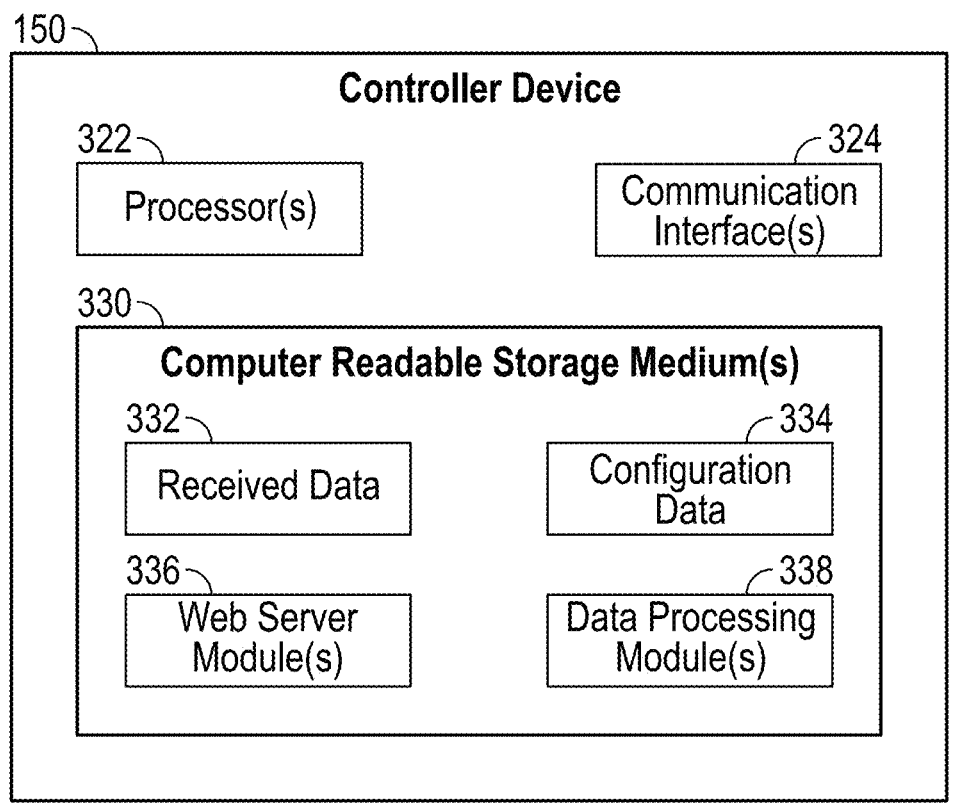
FIG. 3 illustrates a block diagram of an example controller device, according to various embodiments of the present disclosure.

FIG. 3 illustrates a block diagram of an example controller device 150, according to various embodiments of the present disclosure. Controller device 150 may comprise one or more processors 322, one or more communication interfaces 324, and one or more computer readable storage mediums 330, each of which may be in communication with one another. The computer readable storage medium(s) 330 may include received data 332, configuration data 334, web server module(s) 336, and data processing module(s) 338. The received data 332 and the configuration data 334 may be stored in one or more databases of the controller device 150. In various implementations one or more buses, interconnects, wires/cables, etc. may be used to interconnect the various components of the controller device 150, and of the controller device 150 more generally.

In operation, the one or more communication interfaces 324, one or more processors 322, and one or more computer readable storage mediums 330 communicate with one another to, e.g., execute by the processor(s) 322 computer program instructions (e.g., as provided by the configuration data 334, the web server module(s) 336, and/or the data processing module(s) 338); receive, access, and transmit data (e.g., to/from the received data 332 and/or configuration data 334, and via the communication interface(s) 324); and/or the like. Further implementation details are described below.

In operation, the communication interface(s) 324 may provide wired and/or wireless communications with other devices and networks, as described herein. In various embodiments, communications among the various components of the example operating environment 100 may be accomplished via any suitable means. For example, the controller device(s) 150 may communicate with one another, the additional device(s) 180, the human machine interface device(s) 170, the management server 140, and/or the user device(s) 120 via any combination of the network 130, the local network 160, or any other communications means or method (e.g., Bluetooth, WiFi, infrared, cellular, etc.). Accordingly, the communications interface(s) 324 may include one or more of wired and wireless transceivers, such as a Joint Test Action Group (JTAG) transceiver, a Bluetooth or Bluetooth Low Energy (LE) transceiver, an IEEE 802.11 transceiver, an Ethernet transceiver, a USB transceiver, a Thunderbolt transceiver, an infrared transceiver, a wireless cellular telephony transceiver (e.g., 2G, 3G, 4G, 5G), or the like. The communications interface(s) 324 may further include, for example, serial inputs/outputs, digital inputs/output, analog inputs/outputs, and the like. As noted herein, the communications interface(s) 324 may further include one or more application programming interfaces ("APIs").

In operation, the received data 332 includes any operational data, analysis data or results, or data received from the various additional devices 180 by the controller device 150, e.g., via the various input/output ports of the controller device 150. Such received data 332 may include data processed by the controller device 150 (e.g., via the data processing module(s) 338).

In operation, the configuration data 334 includes one or more configurations that configure operation of the controller device 150, as described herein. For example, such configurations may be received from a user and/or the management device 230 (and/or other devices in communication with the controller device 150), and may include various communications specifications (e.g., that indicate functionality of the input and output ports), executable program instructions/code, algorithms or processes for processing the received data, and/or the like. The controller device 150 may store multiple configurations in the configuration data 334, which may be selectively run or implemented, e.g., via user selection via the management server 140, the human machine interface device(s) 170, and/or the user device(s) 120.

In operation, the web server module(s) 336 may include program code executable, e.g., by the processor(s) 322 to provide a web-based access (e.g., interactive graphical user interfaces accessible via web-based communications protocols, rendering of interactive graphical user interfaces written in web-based languages by web-based browsers, etc.) to the controller device 150, e.g., to configure the controller device 150 and/or access data of the controller device 150, as further described herein. Such web-based access may be via one or more communications protocols, e.g., TCP/IP, UDP, WebRTC, etc., and may include one or more secure communications/cryptographic protocols, e.g., TLS, SSL, etc., and may further be provided via communications interface(s) 324. This may include, for example, generating user interface data useable for rendering the various interactive user interfaces described. The user interface data may be used by various computer systems, devices, and/or software programs (for example, a browser program of a user device 120), to render the interactive user interfaces. The interactive user interfaces may be displayed on, for example, electronic displays (including, for example, touch-enabled displays). In various implementations one or more of the management server 140, user device(s) 120, and human machine interface device(s) 170 may communicate with the controller device 150 via one or more of the web server module(s) 336.

In operation, the data processing module(s) 338 may provide processing and analysis of received data, as described herein. The type of processing and analysis may be provided by the configuration data 334, and may result in one or more outputs from the controller device 150 that may be provided via the communications interface(s) 324, as further described herein. In various implementations, the data processing module(s) 338 may be executed by the processor(s) 322, which processor(s) 322 may include various types of processors including special purposes processors, e.g., Graphics Processing Units ("GPUs"), Application Specific Integrated Circuits ("ASICs"), Field-Programmable Gate Arrays ("FPGAs"), and/or the like.

As described herein, received data, analysis results, and/or configuration data may be communicated, e.g., via the communications interface(s) 324, to other devices, such as the management server 140 and/or user device(s) 120. For example, the controller device 150 may be configured to reliably and securely offload data and to transmit the data to the management server 140 regardless of whether the connectivity of the controller device 150 (e.g., to the management server 140) is intermittent. For example, data may be stored by the controller device 150 until connectivity is available, and may then transmit the data to the management server 140.

In various implementations, as described above, the controller device(s) 150 may communicate with one or more additional devices 180, which may include, e.g., various components of a manufacturing/industrial line or process, sensors, etc. Communications with additional device(s) 180 may be via direct (e.g., not via a network) wired and/or wireless communications, and/or may be via a network (e.g., a local network) wired and/or wireless communications. Such communications may be accomplished via one or more APIs. Communications with the additional device(s) 180 may also be accomplished via intermediate communications with existing or legacy devices, such as specialized PLCs (e.g., the controller device 150 may include PCL control languages for communicating with PLCs, such as IEC 61131-3), and/or the like.

In various implementations, as described above, the controller device(s) 150 may communicate with one or more human machine interface devices 170. Communications with human machine interface device(s) 170 may be via direct (e.g., not via a network) wired and/or wireless communications, and/or may be via a network (e.g., a local network) wired and/or wireless communications. Via communications with the human machine interface device(s) 170, users may configure and/or monitor status of the controller device 150. As described herein, the controller device(s) 150 may advantageously communicate with the human machine interface device(s) 170 via the web server module(s) 336.

In various embodiments, the controller device 150, may include various other modules, components, engines, etc. to provide the functionality as described herein. It will be appreciated that additional components, not shown, may also be part of the controller device 150, and, in certain embodiments, fewer components than that shown in FIG. 3 may also be used in the controller device 150.

In various embodiments, firmware of the controller device 150 may be updated such that the controller device 150 may provide additional functionality. Such firmware updating may be accomplished, e.g., via communications with the management server 140, thereby enabling updating of multiple controller devices 150 remotely and centrally. Additional functionality may include, for example, additional communications specifications, additional ways of communicating with additional devices 180 (e.g., additional control languages, etc.), additional configurations or options for configurations, and/or the like.

VI. Example Human Machine Interface Device

Referring again to FIG. 1, human machine interface ("HMI") device(s) 170 may comprise computing devices that provide a means for a user to interact with a device. Human machine interfaces may comprise user interfaces or dashboards that connect a user with a machine, system, or device, commonly used in industrial processes. In various implementations, human machine interface device(s) 170 comprise computer devices with a display and a mechanism for user input (e.g., mouse, keyboard, voice recognition, touch screen, and/or the like). In an implementation, the human machine interface device(s) 170 comprise tablet computing devices.

As noted above, the human machine interface device(s) 170 may communicate with the controller device 150 and/or the management server 140 via direct (e.g., not via a network) wired and/or wireless communications, and/or via a network (e.g., a local network) wired and/or wireless communications. In one example, a human machine interface device 170 communicates with a controller device 150 via a local network and a web server module 336 of the controller device 150. In this example, the human machine interface device 170 is directed to connect with the controller device 150 (e.g., via an IP address and, optionally, a particular port of the controller device 150, or a unique identifier or name associated with the controller device 150) of the controller device 150, and the web server module 336 of the controller device 150 provides a browser-renderable webpage including an interactive HMI. The interactive HMI may include a current status or configuration of the controller device 150, options to change configuration of the controller device 150, and/or the like.

Advantageously, according to various embodiments, a user may configure an interactive HMI user interface layout via the management server 140 (and/or the controller device(s) 150 via the management server 140), and may then push the interactive HMI user interface layout configuration to controller device(s) 150 (e.g., via the management server 140). The controller device(s) 150 may then provide the configured interactive HMI via the web server module(s) 336 as described herein. Advantageously, such functionality may enable remote and centralized configuration of interactive HMIs (and possible duplication of HMIs to multiple controller devices 150) without requiring direct programming or interaction with the controller device(s) 150 or human machine interface device(s) 170.

Advantageously, because the HMI is provided by a web server module 336 of the controller device 150, multiple human machine interface devices 170, and/or the management server 140 may simultaneously access and/or communicate with the controller device 150 (e.g., via the HMI provided via the web server module(s) 336, and/or via other communications means), and a current configuration/status of the controller device 150 may be accurately kept synchronized/kept up-to-date from each device.

Further example embodiments and implementations of HMI functionality are described in further detail below. For example, further description related to network connection of HMI devices to controller devices, and adjusting controller device operation, and interactive graphical user interfaces related thereto, are described, e.g., in reference to FIGS. 11-14.

VII. Example Additional Devices

Referring again to FIG. 1, additional device(s) 180 may include, e.g., various components of a manufacturing/industrial line or process, sensors, and/or the like. For example, additional device(s) 180 may include detector devices that may include a trigger input to the controller device(s) 150, reject devices to which the controller device(s) 150 may provide an output to reject articles, machinery inputs to which the controller device(s) 150 may provide an output in response to various data analyses (e.g., to speed up or slow down a manufacturing process, to adjust a manufacturing process, to actuate or operate a machine, to execute a process, to activate or deactivate a light or process, to communicate with an automated process or device, to communicate with a software program, etc.), multiple components/devices on a manufacturing line to which the controller device(s) 150 may provide configurations, sensors that may provide controller device(s) 150 with input information that may be used by the controller device(s) 150 and/or provided by the controller device(s) 150 to the management server 140, and/or the like. Additional non-limiting examples of additional device(s) 180 include:

Sensors/monitors (e.g., temperature, levels, vibration, power, pressure, etc.)
Facility meters (e.g., water, air, gas, energy, steam, etc.)
Machine/systems I/O (e.g., relays, contacts, valves, flow, etc.)
Legacy equipment (e.g., programmable logic controllers ("PLCs"), controllers, etc.)

As described herein, additional device(s) 180 may be communicated with and/or configured via the controller device(s) 150. Communications with the additional device(s) 180 may also be accomplished via intermediate communications with existing or legacy devices, such as specialized PLCs and/or the like. Alternatively, additional device(s) 180 may be communicated with and/or configured via communication with human machine interface device(s) 170, management server 140, and/or user device(s) 120. Data and information gathered from the additional device(s) 180 may be provided to the management server 140, e.g., via the controller device(s) 150 and/or directly (e.g., via a network).

In various implementations one or more of, or a combination of, the controller device(s) 150, the management server 140, and/or the human machine interface device(s) 170 may provide an application programming interface ("API") by which communications may be accomplished with the additional device(s) 180.

VIII. Example Controller Device Physical Implementation

Figure 4:
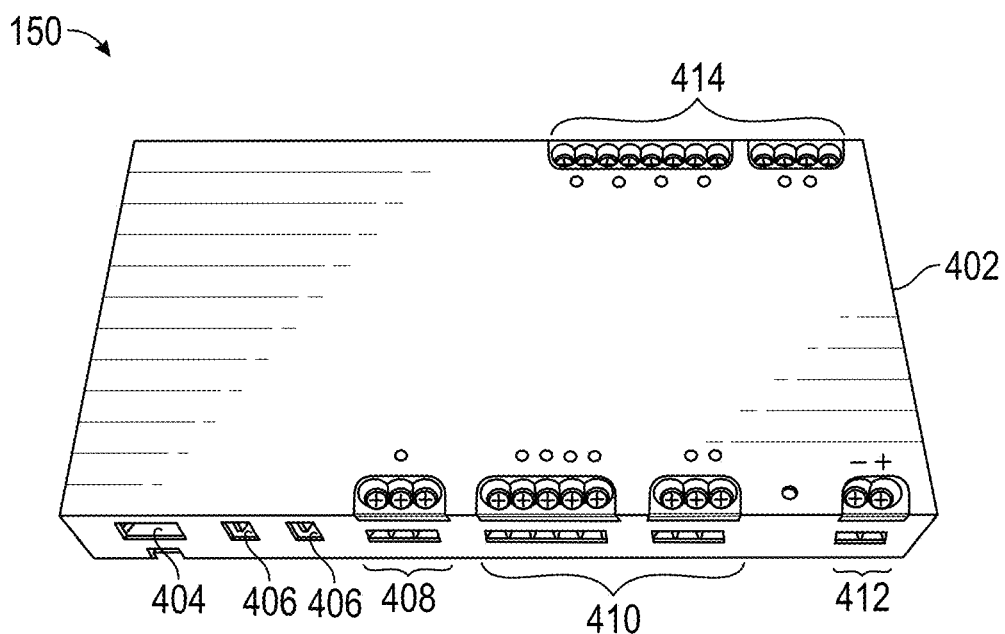
FIG. 4 is a diagram of an example physical implementation of a controller device, according to various embodiments of the present disclosure.

FIG. 4 is a diagram of an example physical implementation of the controller device 150, according to various embodiments of the present disclosure. As described herein, while the embodiment described in reference to FIG. 4 shows one example implementation of the controller device 150, other implementations are contemplated, including implementations that place the various communications interfaces 324 in different locations, or that include more or fewer communications interfaces 324, etc. In various implementations, the controller device 150 may support scalable expansion input/output ("I/O") modules for higher density applications.

FIG. 4 shows a front perspective view of the controller device 150. As shown, the controller device 150 may include a housing 402, which may be made of metal (e.g., aluminum, stainless steel, etc.), plastic (e.g., UV-stabilized polycarbonate, etc.), and/or any other suitable material or combination of materials. The housing 402 may include various ports/connectors (e.g., communications interfaces 324), e.g., for interfacing with additional device(s) 180. For example, the controller device 150 may include an Ethernet port 404, one or more USB ports 406, serial I/O ports 408 (e.g., RS232, RS485, and/or the like), digital I/O ports 410 (which may include counters), and analog I/O ports 414. The controller device 150 may further include power ports 412.

In an implementation, the serial I/O ports 408 are ESD protected, and support RS485 (up to 20 Mbps, 2-wire, half-duplex), RS232 (up to 1 Mbps, 2-wire, full or half-duplex), and various serial protocols (e.g., Modbus slave/master). Various other implementations and specifications of the serial I/O ports 408 are contemplated.

In an implementation, the digital I/O ports 410 may include six pins, each being configurable as input or outputs (open-drain), with ESD/EFT/Surge protection. As inputs, the digital I/O ports 410 may provide dry-contact (internally sourced 3.3V @ 1 mA) or wet-contact (0-30V). As outputs, the digital I/O ports 410 may provide sinking MOSFET outputs, rated 30V, 0.5 A. In an implementation, the digital I/O ports 410 may include two counter inputs with 0-30V, and up to 10 Hz (dry-contact) or up to 10 kHz (wet-contact). Various other implementations and specifications of the digital I/O ports 410 are contemplated.

In an implementation, the analog inputs may include four isolated channels with 0-12 V or 0-24 mA, with a 14-bit ADC resolution, with an accuracy of 0.1% FSR at 25 C, with ESD/EFT/Surge protection, and with an input resistance at 24 mA of 300 ohm. In an implementation, the analog outputs may include two isolated channels with 0-12 V or 0-24 mA, with a 16-bit resolution, with an accuracy of +/−0.2% FSR at 25 C, with ESD/EFT/Surge protection, with a settling time of 5 μs, and with a load range of 1000 ohm (12V)-600 ohm (20 mA). Various other implementations and specifications of the analog I/O ports 414 are contemplated.

In an implementation, the power ports 412 and the controller device 150 may support 10-28 Vdc, and may have a maximum power draw of 10.8 W @ 12V without analog outputs, and 20 W @ 12V with analog inputs. Various other implementations and specifications of the power ports 412 and power characteristics of the controller device 150 are contemplated. In various embodiments, the controller device 150 may include a power supply internal to the housing 402, or external to the housing 402, which may provide power to the controller device 150.

In an implementation, the controller device 150 has general dimensions of 180 mm×118 mm×32 mm. In alternative implementations the controller device 150 may have different dimensions. In an implementation, the controller device 150 housing is rated IP67 under IEC standard 60529. In an implementation, the controller device 150 may be certified for hazardous locations Class 1, Division 2, Groups A, B, C, and D (as defined by the National Electric Code ("NEC") in Articles 500 to 506). In various implementations the controller device 150 may have other ratings, certifications, or classifications.

As described herein, advantageously the functionality of the various I/O ports of the controller device 150 may be configured to particular applications, and may be re-configured as needed, via centralized communication with the management server 140.

IX. Further Example Methods and Functionality

Figure 5:
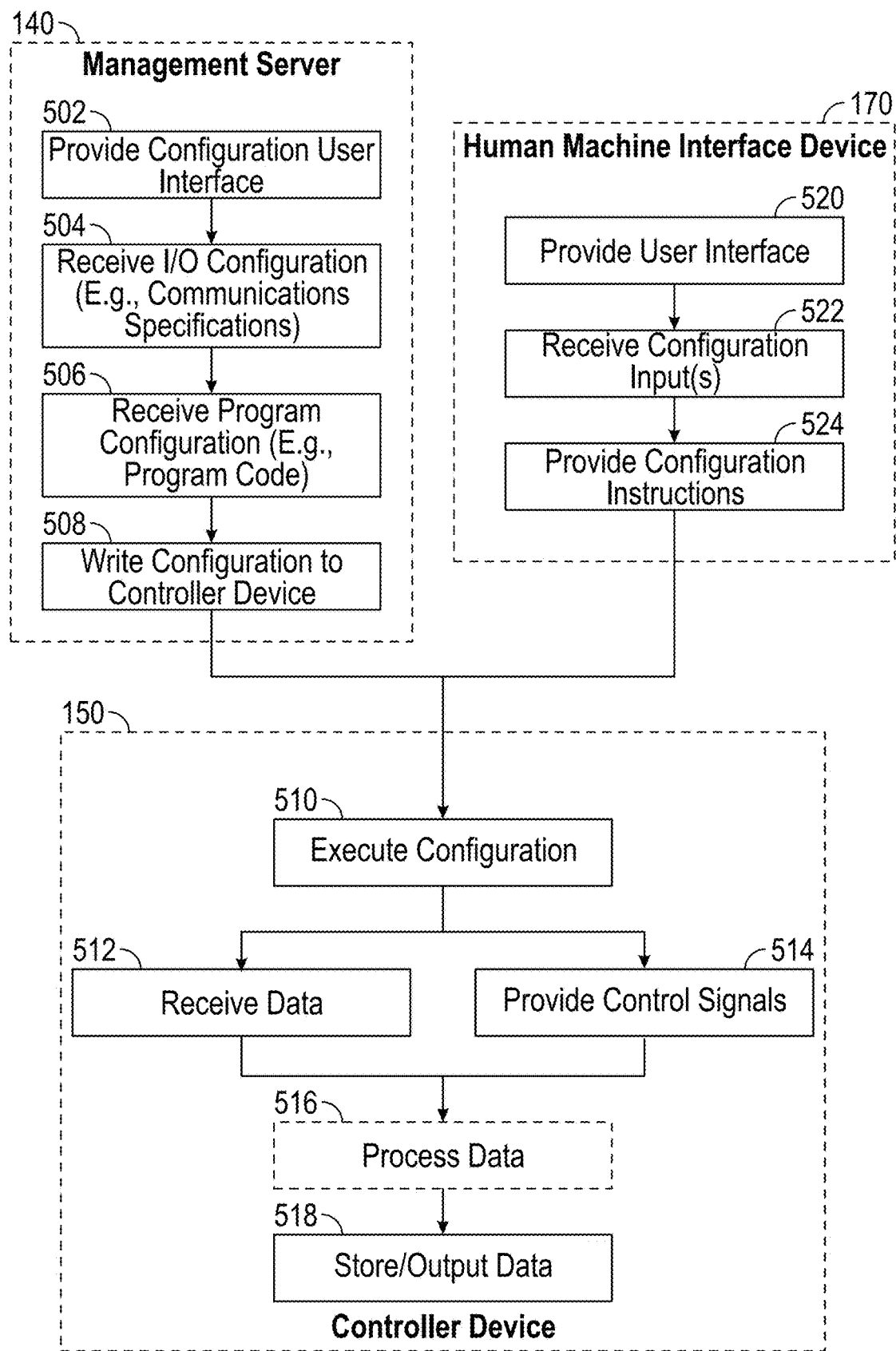
FIG. 5 is a flowchart illustrating example methods and functionality, according to various embodiments of the present disclosure.

FIG. 5 is a flowchart illustrating example methods and functionality, according to various embodiments of the present disclosure. FIG. 5 illustrates example functionality provided by, for example, the management server 140, the human machine interface device(s) 170, and the controller device(s) 150.

At block 502, the management server 140 provides an interactive graphical user interface, which the user may access via user device(s) 120, for example, and by which the user may provide a configuration. The management server 140 may establish secure communications with the controller device 150 while providing the configuration user interface. In various implementations, ongoing secure communications may or may not be necessary, as portions of the configuration implementation may not require such ongoing communications.

At block 504, via the configuration user interface, the user may specify configuration/functionality of the input/output ports of the controller device 150 (e.g., communications specifications). Such communications specifications may enable the controller device 150 to communicate with various additional devices 180 via, e.g., the various communications interface(s) 324 of the controller device 150.

At block 506, via the configuration user interface, the user may specify executable program instructions, code, scripts, etc. to be executed by the controller device 150 as part of the configuration. Such program instructions may, for example, provide for analyses of received data/inputs to the controller device 150 (e.g., from additional device 180), and generation of outputs in response to those inputs. Such program instructions may further, for example, provide for determination of analysis results based on the received data/inputs. Examples of such inputs/outputs include, for example, trigger and/or sensor inputs, inputs/outputs to cause rejection of articles, outputs to machinery to speed up or slow down a manufacturing process, inputs/outputs to adjust a manufacturing process, inputs/outputs to actuate or operate a machine, inputs/outputs to execute a process, inputs/outputs to activate or deactivate a light or process, inputs/outputs to communicate with an automated process or device, inputs/outputs to communicate with a software program, etc.

At block 508, the management server 140 implements and/or duplicates the configuration to one or more controller device(s) 150. For example, the management server 140 may write the configuration to one or more controller devices 150 via wireless communication with the controller devices 150. Advantageously, the management server 140 may enable users to centrally access, copy, duplicate, modify, etc. configurations for multiple controller devices 150, making updating one or multiple controller devices 150 rapid and efficient.

In various embodiments, a configuration can additionally include information useable by the controller device 150 regarding local and remote storage of received data and analysis data, and/or the like.

Further description related to providing/implementing configurations, and interactive graphical user interfaces related thereto, are described, e.g., in reference to FIGS. 7A-7C and 10A-10C.

As described herein, configurations may be implemented, and statuses of controller device(s) 150 may be monitored, via human machine interface device(s) 170. Accordingly, alternatively and/or in addition to blocks 502, 504, 506, and 508 described above in reference to functionality of the management server 140, at blocks 520, 522, and 524 the human machine interface device(s) 170 may provide functionality.

At block 520, the human machine interface device 170 may display an interactive graphical user interface related to monitoring status of the controller device(s) 150 and/or implementing configurations on the controller device(s) 150. As described herein, the controller device 150 may provide secure remote access, e.g., via a web server executing on the controller device 150 (e.g., by web server module(s) 336), to provide interactive HMIs and receive selections of configurations. At block 522, the human machine interface device 170 receives a user input selecting a configuration, and at block 524 the selection of the configuration is provided to, or received by, the controller device 150.

While blocks 520, 522, and 524 of example process of FIG. 5 focus on the example of the human machine interface device(s) 170, in various embodiments configurations may be received by the controller device(s) 150 from, e.g., the management server 140, human machine interface device(s) 170, and the user device(s) 120. In various embodiments, the interactive HMIs may comprise relatively streamlined interactive graphical user interfaces. For example, the interactive HMIs may comprise relatively few large buttons by which a user may select to stop a currently running configuration, may select a different configuration from a list (e.g., of configurations stored on the controller device 150), may search for a different configuration, and/or may monitor a current status of inputs/outputs, analyses, and/or the like. Examples of information that may be included in HMIs include real-time current values of machine inputs, e.g., production count, power levels, value, progress bar, status light, on/off light, etc. Examples of additional buttons/functionality that may be included in HMIs include toggling an analog/digital I/O on/off, sending a Modbus signal or analog I/O signal, starting or stopping a production run, etc. Further description related to generating and using HMIs for operation control are described, e.g., in reference to FIGS. 13-14.

Advantageously, via a human machine interface device 170 (and/or the management server 140 and/or user device(s) 120), a user may communicate with one or more controller device(s) 150 to, e.g., activate multiple devices (e.g., multiple additional devices 180), e.g., as part of a manufacturing process, industrial process or industrial monitoring process, and/or the like.

As described above, one or more configurations of the controller device 150 may be stored by the controller device 150 (e.g., in configuration data 334), and may further be synchronized with the management server 140 and/or the human machine interface device(s) 170. In various implementations, communication of configurations may be accomplished without the use of a web server.

In various implementations, the controller device 150 may provide, optionally via a web server, secure remote access to the controller device 150 by, e.g., the management server 140, the user device(s) 120, and/or the human machine interface device(s) 170. Via such access a user may, for example, monitor a status of the device, view a live data stream from the device, configure the device, and/or access received data and/or analysis data.

As described herein, in various embodiments alerts may be sent to users based on, e.g., data analysis results. The management server 140 may provide such alerts to user device(s) 120. In some embodiments, the alert and/or notification is automatically transmitted to a device operated by the user and/or organization associated with a corresponding trigger. The alert and/or notification can be transmitted at the time that the alert and/or notification is generated or at some determined time after generation of the alert and/or notification. When received by the device, the alert and/or notification can cause the device to display the alert and/or notification via the activation of an application on the device (e.g., a browser, a mobile application, etc.). For example, receipt of the alert and/or notification may automatically activate an application on the device, such as a messaging application (e.g., SMS or MMS messaging application), a standalone application (e.g., productions line monitoring application), or a browser, for example, and display information included in the alert and/or notification. If the device is offline when the alert and/or notification is transmitted, the application may be automatically activated when the device is online such that the alert and/or notification is displayed. As another example, receipt of the alert and/or notification may cause a browser to open and be redirected to a login page generated by the system so that the user can log in to the system and view the alert and/or notification. Alternatively, the alert and/or notification may include a URL of a webpage (or other online information) associated with the alert and/or notification, such that when the device (e.g., a mobile device) receives the alert, a browser (or other application) is automatically activated and the URL included in the alert and/or notification is accessed via the Internet.

Figure 9A:
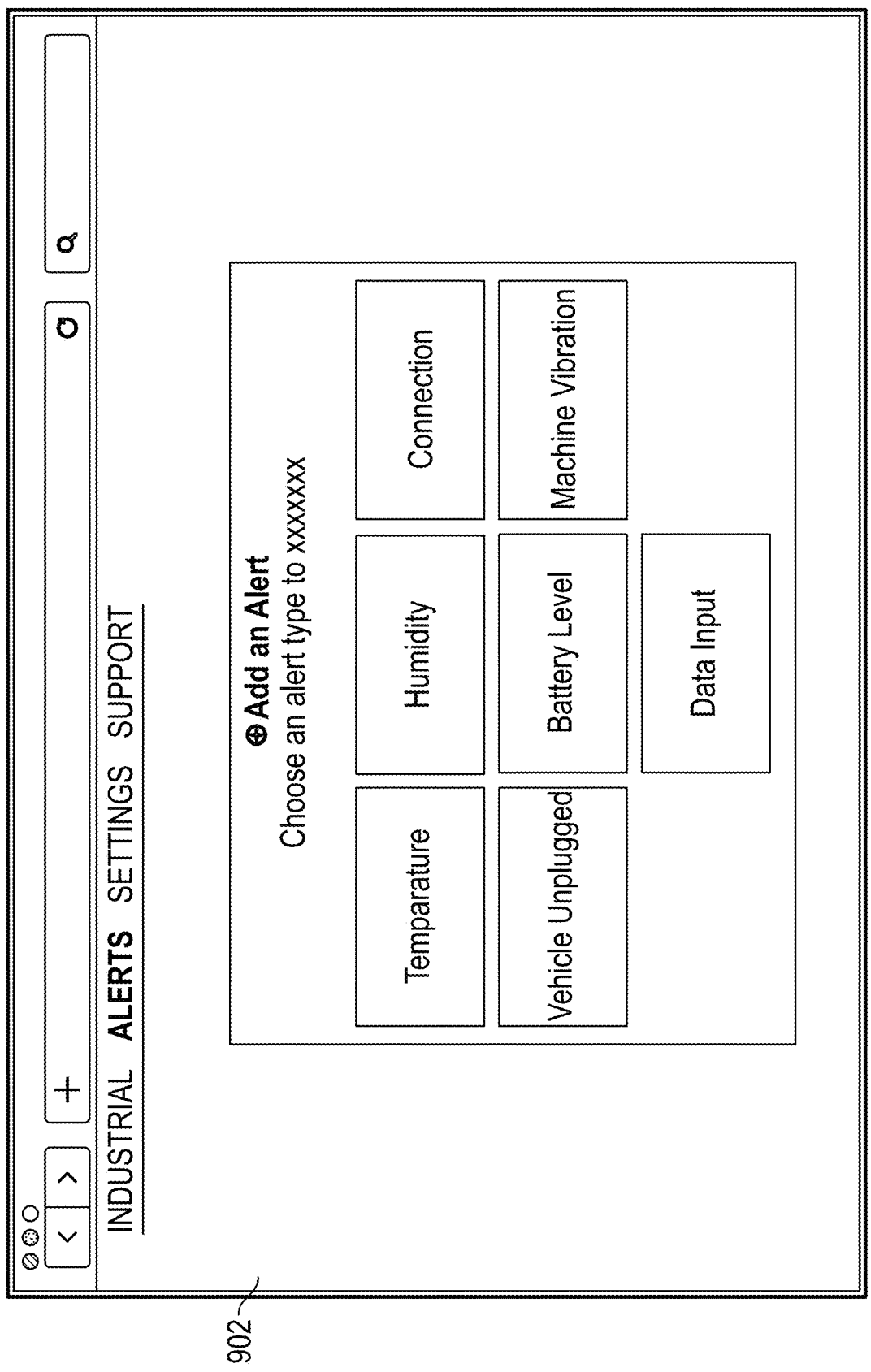

Further description related to providing/implementing alerts, and interactive graphical user interfaces related thereto, are described, e.g., in reference to FIGS. 9A-9C.

Referring again to FIG. 5, at block 510 the controller device 150 executes the received/selected configuration. Execution of the configuration includes, for example, implementation of the communications specifications and program code/instructions. Thus, at block 512, the controller device 150 may receive data/inputs from various additional device(s) 180, and at block 514, provide outputs/control signals to various additional device(s) 180. At block 516, the controller device 150 (e.g., by data processing module(s) 338) may process/analyze received data (according to the current configuration), and at block 518 received data, analysis data, and/or configurations may be locally stored and/or transmitted for remote storage.

In various embodiments, data analysis and/or decision making performed by controller device 150 (e.g., by the data processing module(s) 338) may include execution of deterministic and/or non-deterministic analysis algorithms. In some examples, the controller device 150 may use machine learning and/or artificial intelligence algorithms for detection of patterns in the received data. Accordingly, based on the data processing/analysis, the device may provide outputs, e.g., via communications interface(s) 324, that may be provided to any external device, e.g., additional device(s) 180. Examples of such outputs are described herein. Advantageously, providing outputs direct from the controller device 150 may eliminate the need for a separate PLC to, e.g., communicate with other devices/systems.

As mentioned above, the received data and analysis data (e.g., any and/or all information associated with the analysis/processing, including, e.g., features detected, decisions made, etc.) may be stored and/or logged by the controller device 150, e.g., in a memory/computer readable storage medium. In some implementations, the received data and analysis data may be stored indefinitely. In some implementations, the received data and analysis data may be stored for a period of time, e.g., rolling based on an acquisition date/time, and then deleted. In some implementations, the received data and analysis data may be stored or not stored, or stored for a period of time, based on an outcome/decision of the applicable processing/analysis. For example, data associated with positive outcome/events/determinations may be stored for a shorter period of time (or not at all), while data associated with adverse outcome/events/determinations may be stored for a longer period of time. In some implementations, storage of the received data and analysis data may be based on any combination of the above. In general, the analysis, processing, etc. of data may generally and broadly be referred to herein as "evaluation" of data.

As also mentioned above, advantageously, the controller device 150 may also offload received data and analysis data to the management server 140 (for storage and further analysis by the management server 140) via wired or wireless communications (e.g., via communications interface(s) 324). In some implementations, the received data and analysis data may be offloaded prior to deletion of such data on the controller device 150. In some implementations, the received data and analysis data may be offloaded in real-time or substantially real-time, or as long as communication with the management server 140 is available. In some implementations, the received data and analysis data may be offloaded periodically, in batches, and/or on demand. In some implementations, the received data and analysis data may be offloaded or not offloaded based on an outcome/decision of the applicable processing/analysis. In some implementations, the received data and analysis data may be offloaded based on and age of the received data and analysis data. In some implementations, the received data and analysis data may be offloaded or not offloaded based on network bandwidth availability, time of day (e.g., to preserve bandwidth during business hours), a threshold or cap on network bandwidth usage, and/or the like. In some implementations, offloading of the received data and analysis data may be based on any combination of the above.

In an implementation, a livestream of the received and/or analysis data (e.g., live operational data) may be provided to external devices. For example, a livestream may be provided via any suitable communications protocol, and one or more of a web server module 336 or communications interface(s)

324, to user device(s) 120 (e.g., via any combination of network 130, local network 160, or management server 140). Accordingly, a user may access the livestream in an interactive graphical user interface provided on a user device 120. Advantageously, the livestream may be provided via a separate communications path/web server, to avoid the overhead and resulting reduced efficiency that may be incurred if a livestream was obtained further down the processing pipeline.

Further description related to the management server 140 receiving and aggregating data, and interactive graphical user interfaces related thereto, are described, e.g., in reference to FIGS. 6A-6F and 8A-8D.

In various implementations, various aspects of the functionality described in reference to FIG. 5 may be accomplished in substantially real-time, e.g., received data may be processed as it is received. Alternatively, various aspects of the functionality described in reference to FIG. 5 may be accomplished in batches and/or in parallel.

X. Example Graphical User Interfaces

FIGS. 6A-6F illustrate example interactive graphical user interfaces related to analysis of data from controller devices, according to various embodiments of the present disclosure. The interactive graphical user interfaces of FIGS. 6A-6F may be provided by the management server 140, and may be accessible via user device(s) 120. In general, received data and analysis data are automatically gathered from multiple controller devices 150 by the management server 140 (as described herein), and the received data and analysis data may then be further aggregated and analyzed to provide information and insights as described herein. Typically, the graphical user interfaces provided by the management server 140 are specific to an organization, and may include information from multiple controller devices 150 associated with the organization.

Figure 6A:
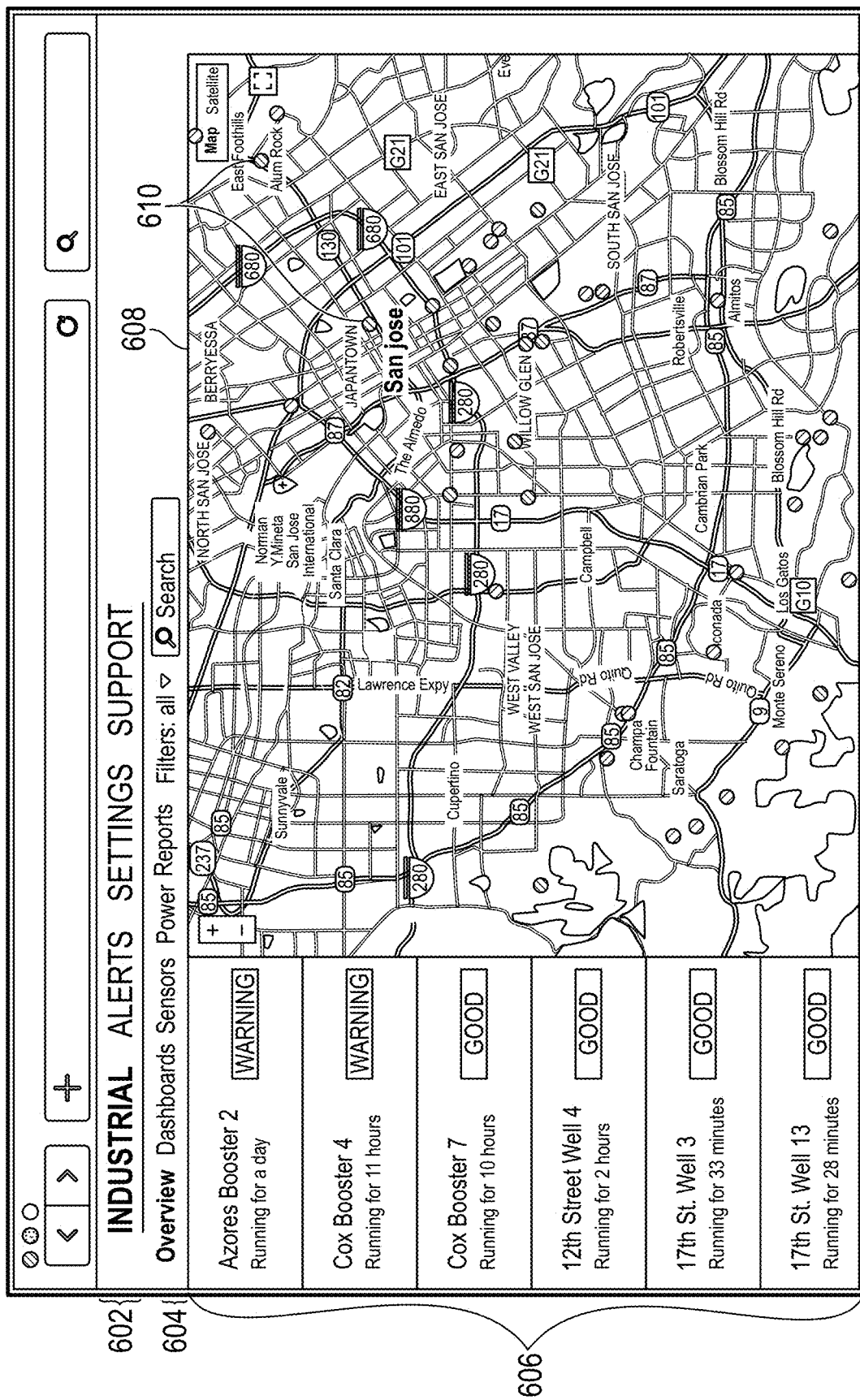
FIGS. 6A-6F illustrate example interactive graphical user interfaces related to analysis of data from controller devices, according to various embodiments of the present disclosure.

FIG. 6A includes selectable options 602 and 604 for accessing various pages, user interfaces, and aspects of the interactive graphical user interfaces provided by management server 140. FIG. 6A further includes a list 606 of controller devices (e.g., controller device(s) 150 in communication with the management server 140 or known by the management server 140, and associated with the current user and/or organization of the current user), and a map 608 with plotted points 610 indicating locations associated with each of the controller devices. In an implementation, each of the items of list 606 may indicate a combination of controller devices that, e.g., may be part of a same industrial process, manufacturing line, etc. The list 606 indicates a current status of each of the controller devices (e.g., "good", "warning", etc.), and an indication of an amount of time each controller device has been running in its current configuration. Each controller device is indicated by a name associated with the controller devices as stored by the management server 140 and/or the controller device(s) 150. The user may select points 610 on the map 608, and/or items from the list 606, to access further details. In an implementation, the points 610 are colored based on a status of the associated controller device(s) 150.

Figure 6B:
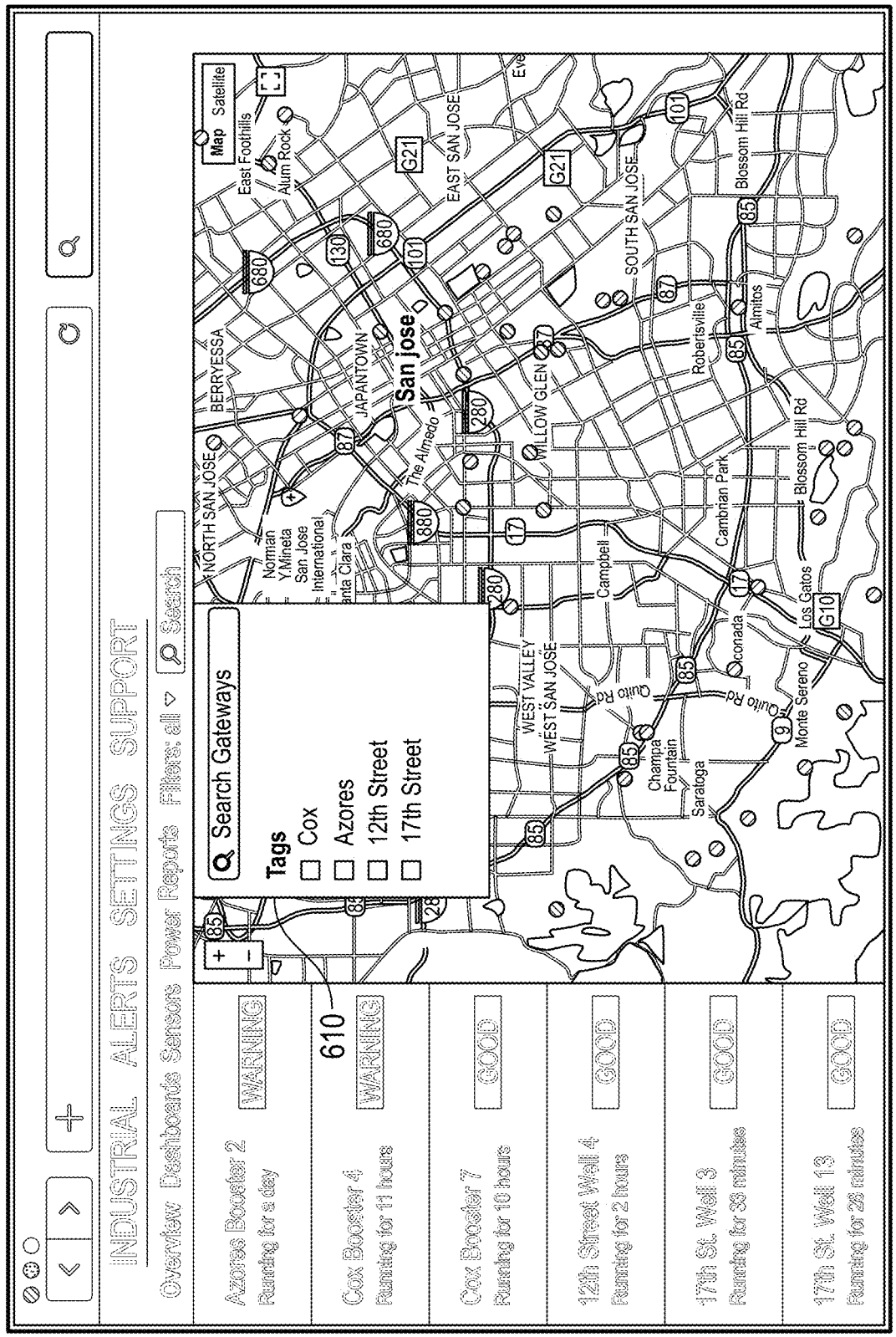
Figure 6C:
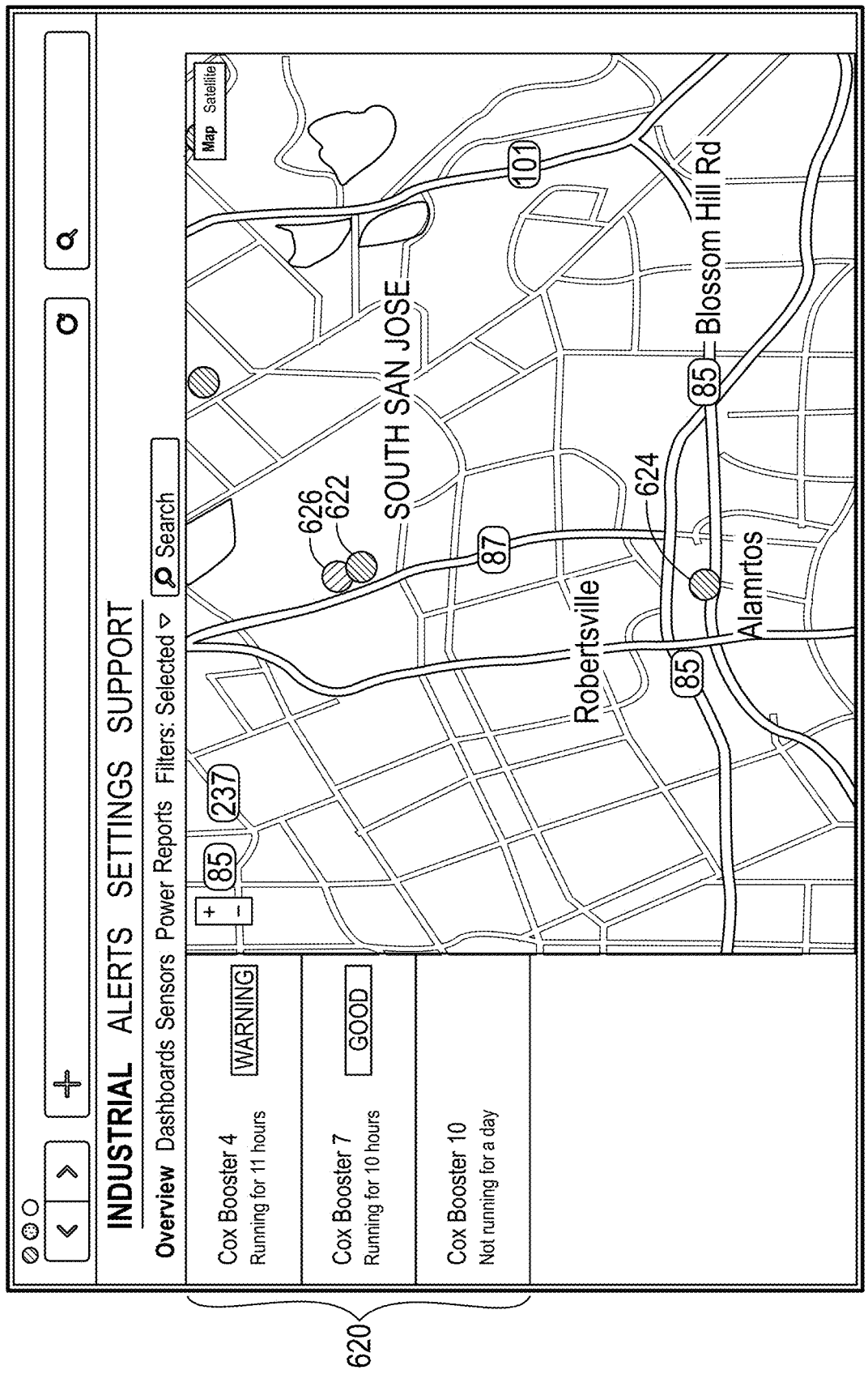

FIG. 6B illustrates that the user may use a filter/search box 611 to filter the controller device(s) 150. FIG. 6C illustrates the results of the user filtering to controller device(s) 150 tagged "cox". As shown, a filtered list 620 is now shown, and associated points 622, 624, and 626 are shown in the map (wherein the map has automatically been zoomed based on the filtered controller devices).

Figure 6D:
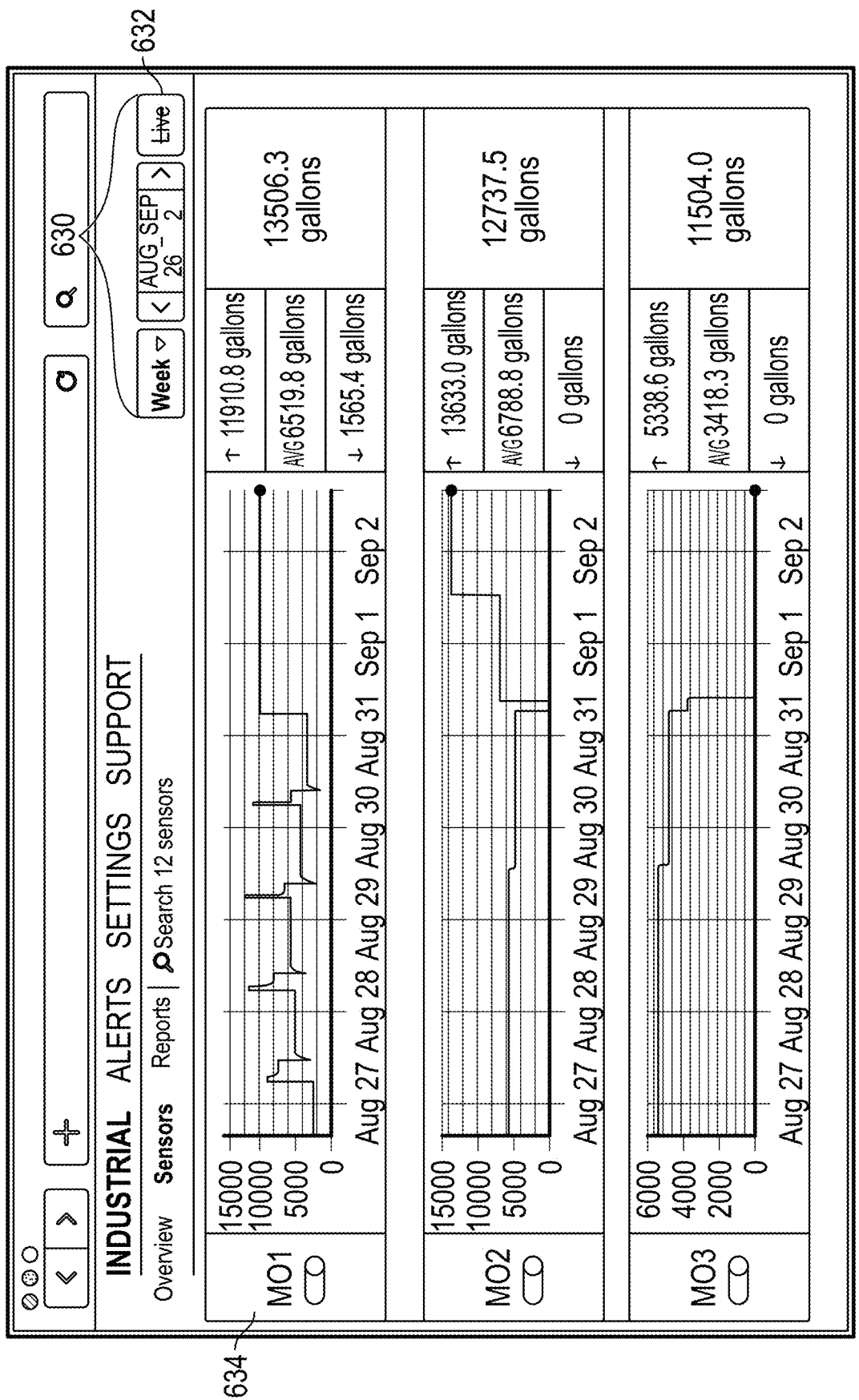

FIG. 6D illustrates an interactive graphical user interface that may be displayed when the user selects to view details related to a specific controller device (or group of controller devices controller device 150 (e.g., via selection of one of the listed items or plotted points of FIGS. 6A-6C). The graphical user interface of FIG. 6D includes separate portions associated with each, e.g., additional device 180 providing data to, and/or being controlled by, the selected controller device 150. Portion 634 shows an additional device 180 labeled MO1, including a chart of data received from the additional device 180, and various calculated information related thereto. At 630 the user can select a particular date range of interest, and may select how the data associated the additional device(s) 180 should be aggregated (e.g., day, week, month, etc.). At 632 the user may determine whether the displayed data is live data, and may select to view live, constantly updated data being received from the related controller device(s) 150.

In various implementations, additional device(s) 180 and controller device(s) 150 may be partitioned or grouped in different ways, and aggregated data associated with these devices may be displayed and interacted with by a user. The aggregated data may be partitioned or grouped based on identifiers associated with the controller device(s) 150 and additional device(s) 180, and/or they may be grouped based on configurations, locations, programs, industrial processes, etc. Accordingly, the user may rapidly obtain an overview of the status of many controller device(s) 150 (and associated additional device(s) 180) simultaneously. Further aggregated information that may be provided in interactive graphical user interfaces of the management server 140 may include various analytics.

Advantageously, the present devices and systems, according to various embodiments, may be used to track and analyze data from various types of industrial processes and calculated various metrics (e.g., track flow, pressure, tank levels, power usage; calculate efficiencies; control oil and gas flows; determine machine heath, downtime, metrics, etc.).

Figure 6E:
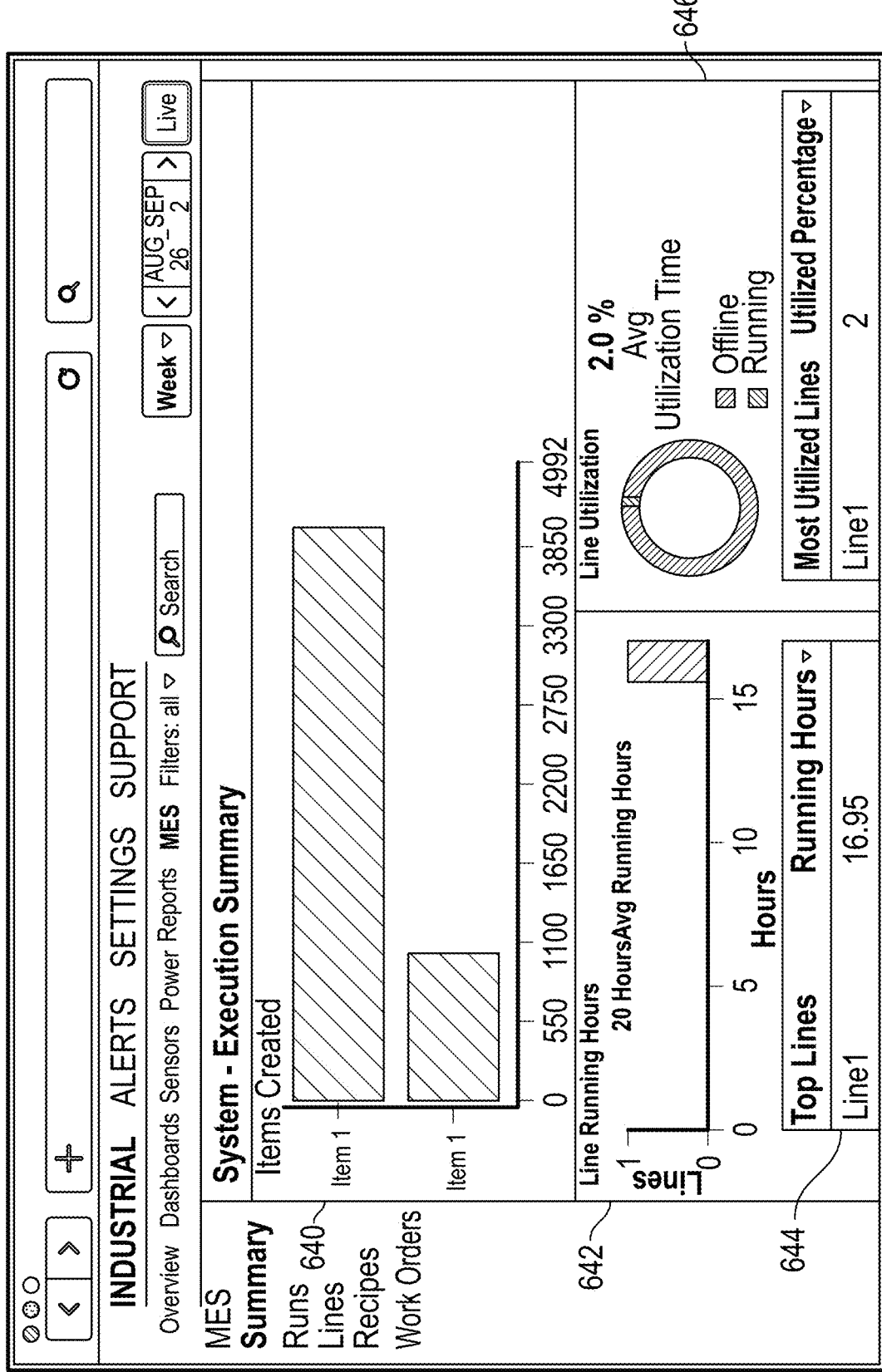

FIG. 6E illustrates an example interactive graphical user interface that includes aggregated data related to a particular Manufacturing Execution System ("MES"). The information provided via the example graphical user interface of FIG. 6A may be aggregated by the management server 140 from one or more controller device(s) 150, and may include, for example, a summary chart 640 of items created of various types, information 642 and 644 on line running hours, and information 646 on line utilization.

Figure 6F:
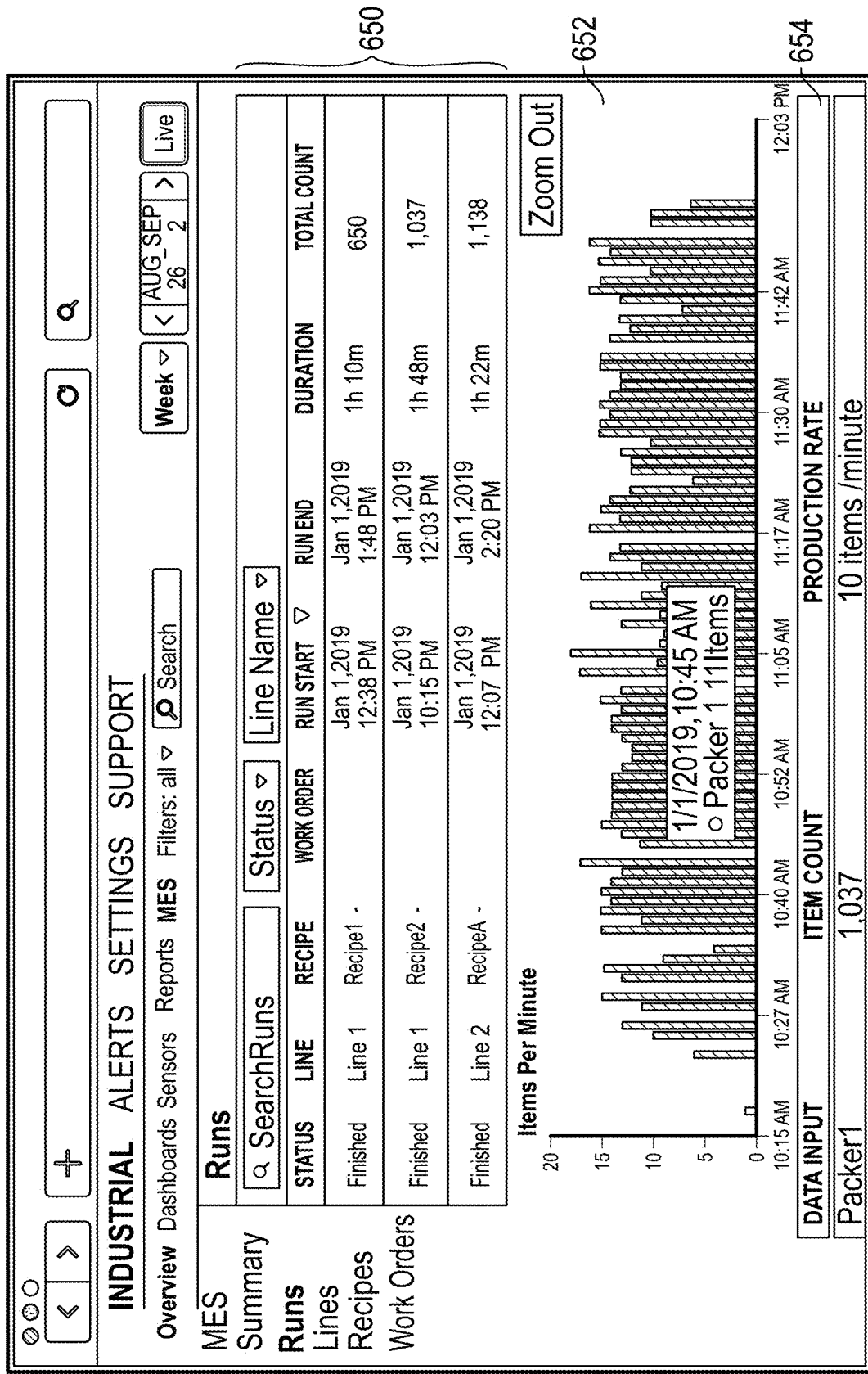

FIG. 6F illustrates an example interactive graphical user interface in which the user has drilled down to view specific runs on the MES, and can view information 650 related to the various runs, and an interactive chart 652 and table 654 related to the same.

FIGS. 7A-7C illustrate example interactive graphical user interfaces related to controller device configuration, according to various embodiments of the present disclosure. The interactive graphical user interfaces of FIG. 7A-7C may be provided by the management server 140, and may be accessible via user device(s) 120.

Referring to FIG. 7A, as indicated at 702, the user may access a table of various controller device(s) 150 available to monitor/configure. The table indicates names, IDs, types, currently deployed configurations ("programs"), dates, and durations related to each controller device. Via the graphical user interface, the user may select to access further details related to particular controller devices.

FIG. 7B illustrates an example interactive graphical user interface showing details related to a particular controller device 150. The information includes an indication 710 (and details related to, including a current automation script/program 712), a currently deployed configuration. The graphical user interface also includes, at 714, a history of previously deployed configurations, including a time-based chart showing when and for what duration each configuration was deployed. Via button 716 the user may select to edit the particular configuration.

FIG. 7C illustrates an example interactive graphical user interface for editing a configuration. Editing a configuration may be accomplished, for example, by editing the configuration on the management server 140, and then subsequently deploying the configuration to the controller device 150. Alternatively, editing a configuration may be accomplished, for example, by communicating with a web server on the controller device 150 of interest, and accessing user interfaces provided by the controller device 150 to modify a configuration directly on the controller device 150.

List 720 provides information related to various revisions of the present configuration, which revision may easily be accessed, reviewed, and compared in the graphical user interface. Via editor 722 the user may directly edit the program code associated with the configuration (e.g., via inputting/editing a script according to an automation scripting language interpretable by the controller device 150). Via button 724, the user may deploy the configuration to the controller device 150.

FIGS. 8A-8D illustrate example interactive graphical user interfaces related to dashboard generation, according to various embodiments of the present disclosure. The interactive graphical user interfaces of FIG. 8A-8D may be provided by the management server 140, and may be accessible via user device(s) 120.

Figure 8A:
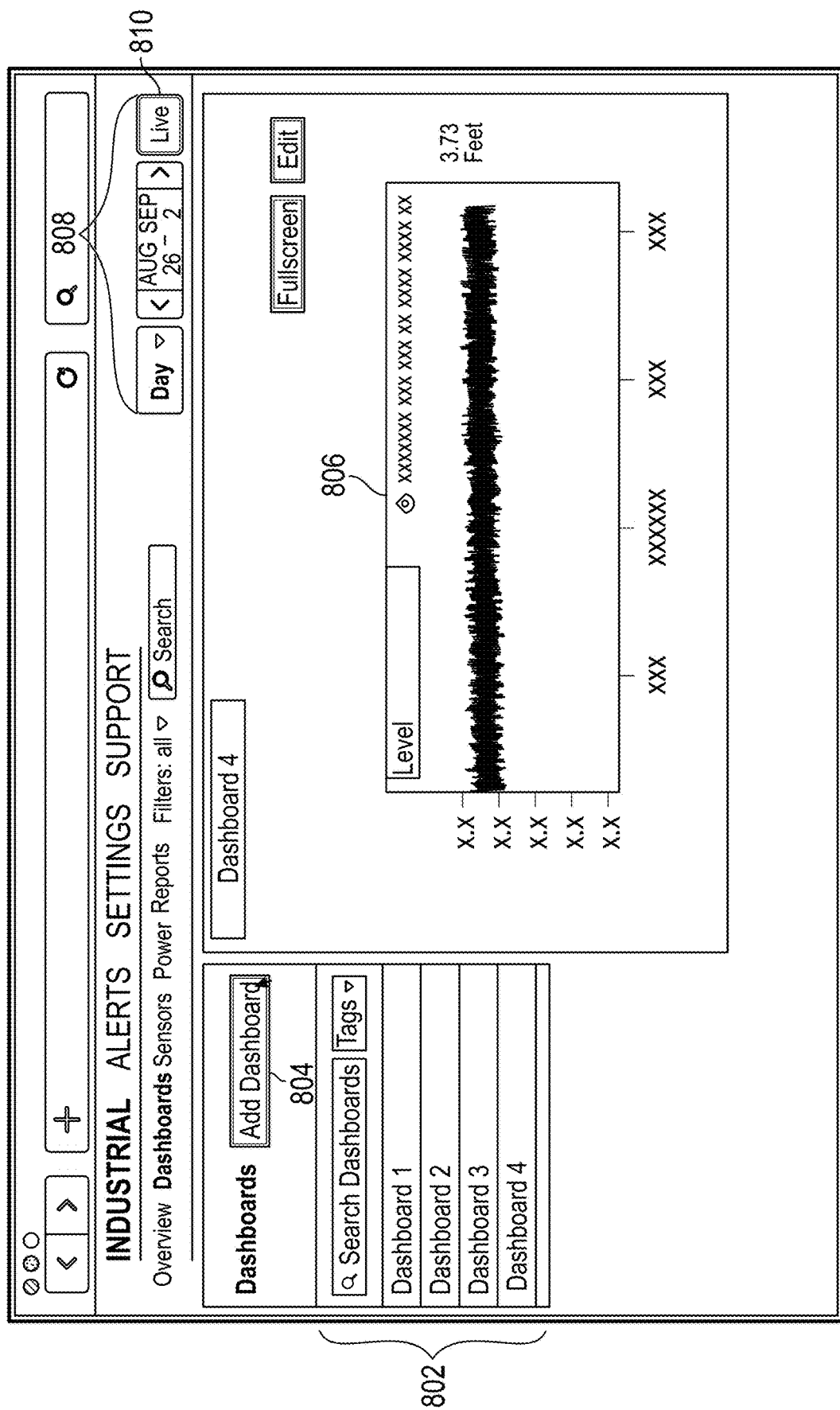
FIGS. 8A-8D illustrate example interactive graphical user interfaces related to dashboard generation, according to various embodiments of the present disclosure.

Referring to FIG. 8A, the user may access and view various "dashboards" via list 802, which dashboards can include any aggregated data from one or more controller device(s) 150 and/or additional device(s) 180. An example "Dashboard 4" is shown, which includes a chart 806. At 808 the user can select a particular date range of interest, and may select how the data associated the controller device(s) 150 and/or additional device(s) 180 should be aggregated (e.g., day, week, month, etc.) for display in the dashboard. At 810 the user may determine whether the displayed data is live data, and may select to view live, constantly updated data being received from the related controller device(s) 150 and/or additional device(s) 180.

Figure 8B:
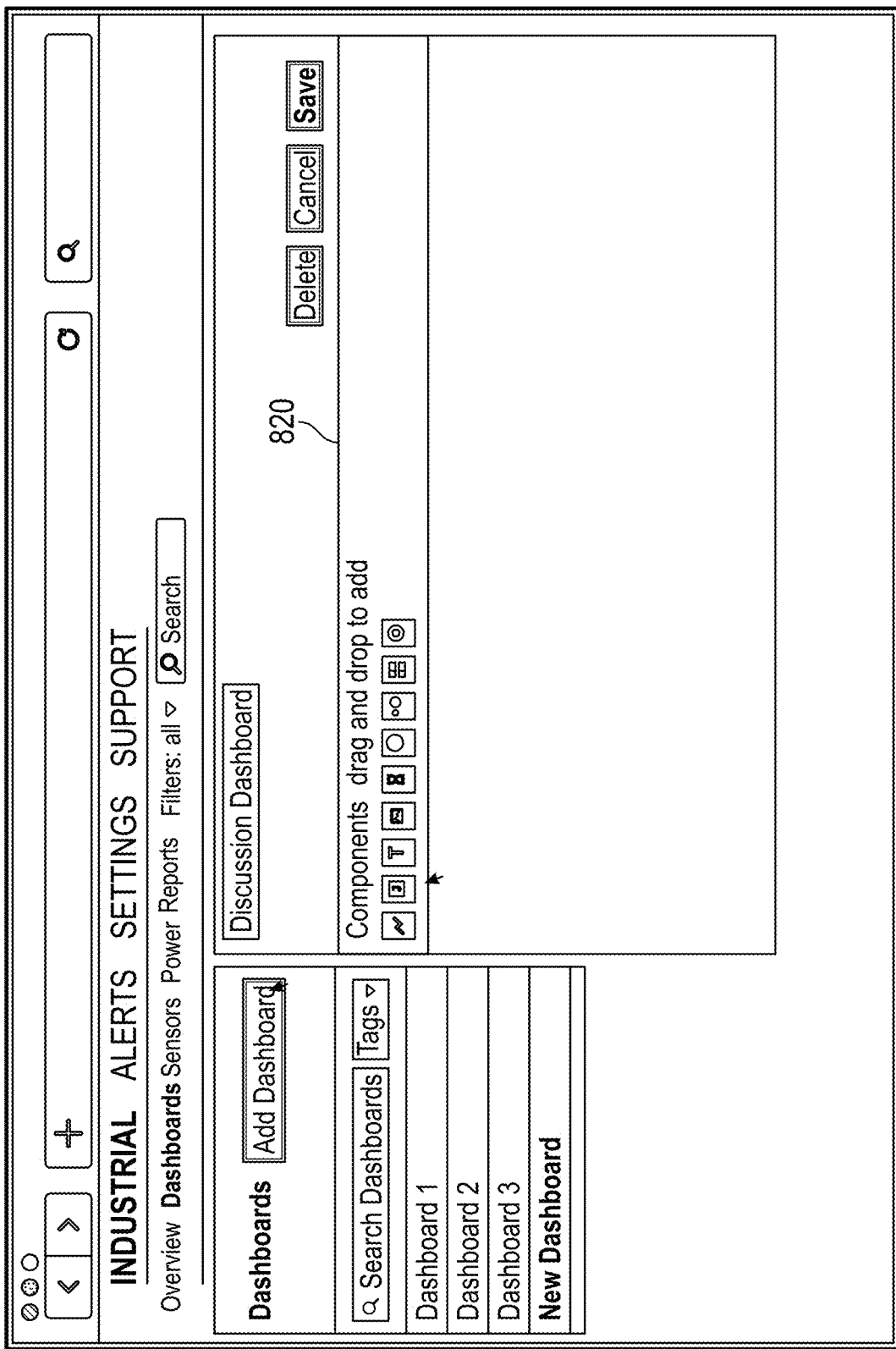
Figure 8C:
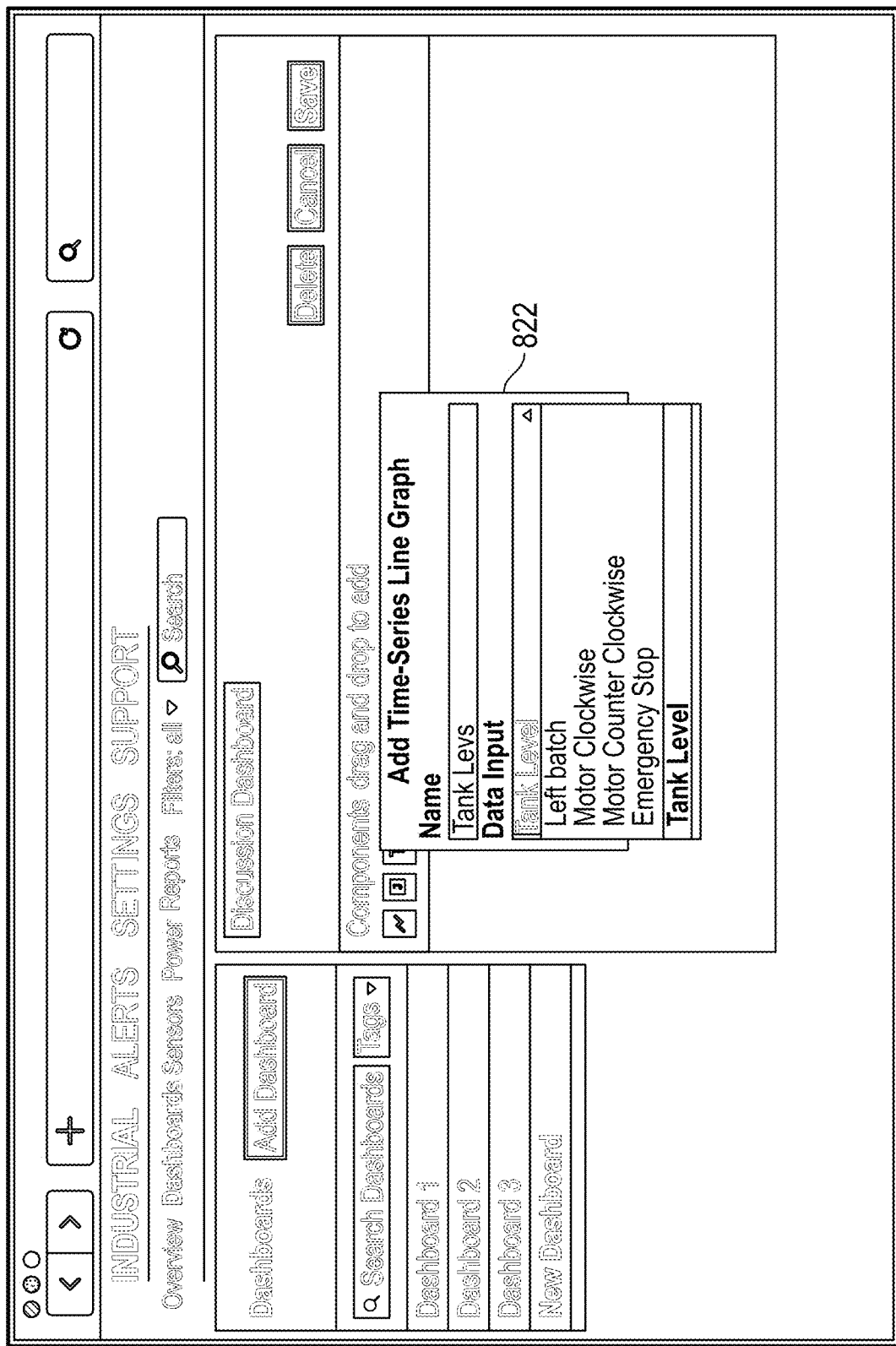

Via button 804, the user may add a new dashboard, which may be freely and interactively customized by the user. Referring to FIG. 8B, an interactive user interface 820 is shown by which the user may set up and customize a dashboard. The user may interactively drag and drop the various icons representing various types of widgets (e.g., charts, graphs, indicators, maps, text, etc.) onto the canvas below to add the widgets to the dashboard. FIG. 8C illustrates adding a time-series line graph widget to the dashboard. When added, the user can customize the widget via dialog box 822, by, e.g., providing a name, and linking the widget to a particular data input. The listed data inputs are determined based on inputs provided from the various controller device(s) 150 registered with the management server 140. Accordingly, the user may easily develop a dashboard with information obtained directly from various controller device(s) 150, and thereby additional device(s) 180.

Figure 8D:
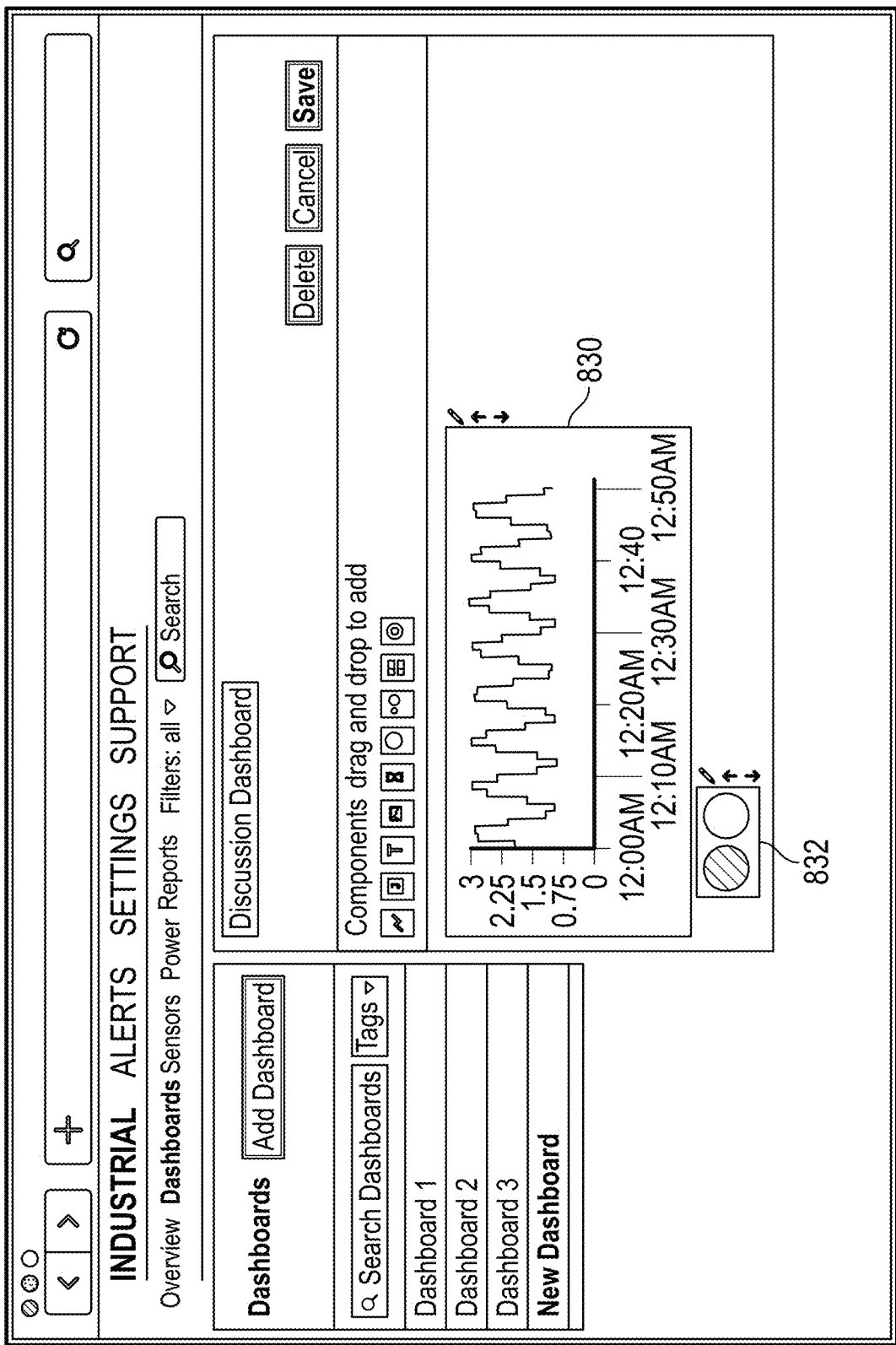

FIG. 8D illustrates an example dashboard after the user has added a time-series line graph widget 830, and an on/off indicator widget 832, and linked the widgets to particular inputs/outputs/determinations of one or more controller device(s) 150. The user may then save the dashboard and access it at any time to review live and/or historical aggregated data.

According to an embodiment, the management server 140 may include dashboard and/or widget templates associated with particular types of additional device(s) 180 (and/or controller device(s) 150). For example, particular types of monitors or sensors (e.g., an energy/power sensor, an asset health monitor, and environmental sensor, etc.) may be preregistered with the management server 140 and associated with particular dashboard templates, such that when a monitor/sensor is in communication with the management server 140 (e.g., via a controller device 150), the management server 140 automatically provides a dashboard that is based on the template and populated with data received from the monitor/sensor.

According to various embodiments, the dashboards (including dashboard access and creation) described above, may be implemented on the controller device 150 itself, such that interactive graphical user interfaces similar to those described above may be accessible directly via communication with a controller device 150 (e.g., a user device 120 or human machine interface device 170 accessing the controller device 150 via a web server modules 336).

According to various embodiments, the dashboards can automatically resize and adjust for viewing on various sizes of displays.

According to various embodiments, the user may interact with interactive graphical user interfaces similar to those described above to generate HMIs that can be pushed/deployed to human machine interface device(s) 170.

FIGS. 9A-9C illustrate example interactive graphical user interfaces related to alert generation, according to various embodiments of the present disclosure. The interactive graphical user interfaces of FIG. 9A-9C may be provided by the management server 140, and may be accessible via user device(s) 120.

Referring to FIG. 9A, via interactive graphical user interface 902 the user may set up one or more alerts on the management server 140. The user may initially select a type of alert to set up as shown in graphical user interface 902. In the graphical user interface 904 of FIG. 9B, the user may specify various parameters related to the alert. For example, the user may indicate an input or determined measurement (e.g., as determined by the management server 140 and/or one or more controller device(s) 150) upon which to base the alert, and one or more alert recipients or actions to take upon triggering of the alert. In the example of FIG. 9B, the alert is based on a "tank level" as received via data from a controller device 150.

FIG. 9C illustrates an interactive graphical user interface including a listing of alerts 906 that have been set up, and which the user can select, e.g., to then modify the alerts.

Figure 10A:
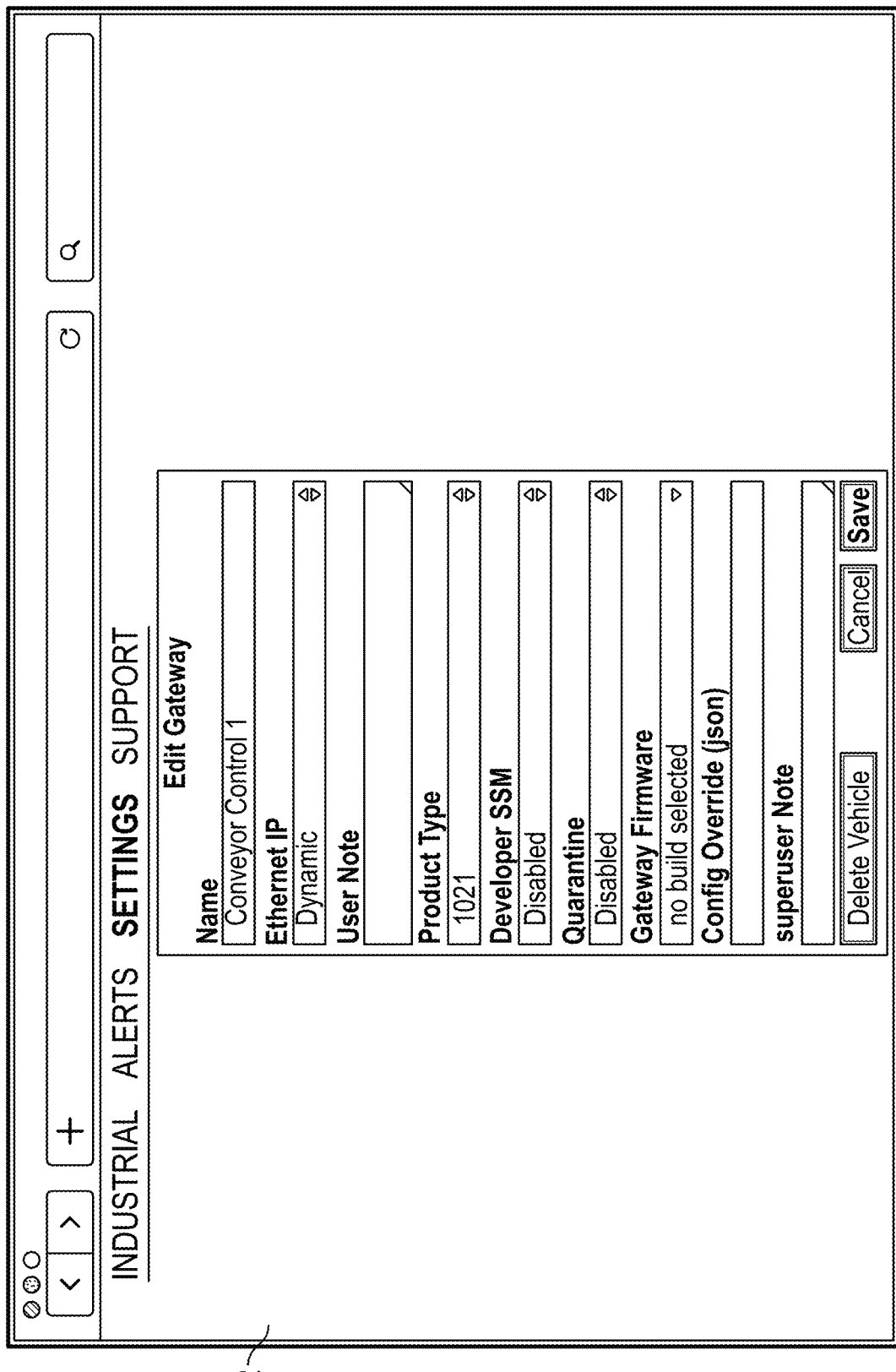
Figure 10B:
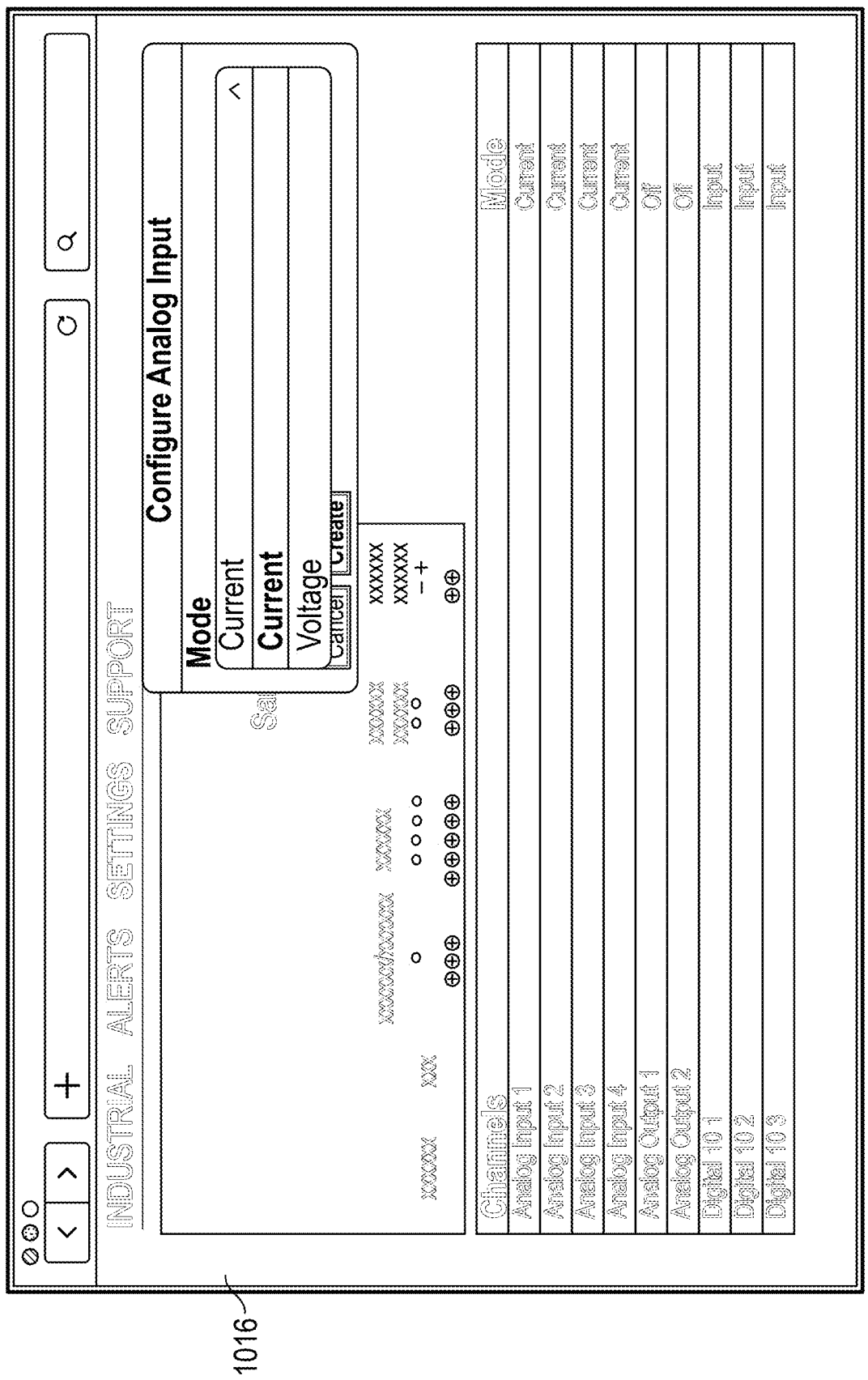

FIGS. 10A-10C illustrate example interactive graphical user interfaces related to controller device configuration, according to various embodiments of the present disclosure. The interactive graphical user interfaces of FIG. 10A-10C may be provided by the management server 140, and may be accessible via user device(s) 120.

Referring to FIG. 10A, the user may use the graphical user interface 1002 to setup and/or edit various setting and properties related to a particular controller device 150. Such settings may include setting a name, selecting a firmware version, and the like. Referring to FIG. 10B, the user may configure the various communications interface(s) 324 of the particular controller device 150, including the various communications specifications of the various ports. Via graphical user interface 1016, the user may select each individual input and output port, and may set all relevant settings and properties. Referring to FIG. 10C, the user may configure the communications specifications related to a particular input. Communications specifications specified by the user via FIGS. 10A-10C advantageously enable, according to various embodiments, centralized setting up a configuration, which configuration may then be deployed to one or more controller devices 150 via the management server 140. According to an embodiment, the user may "mass export" and "mass import" configuration specifications for a device, e.g., that specify the settings for all inputs and outputs at one time.

In an embodiment, interactive graphical user interfaces may be provided by the management server 140 for setting up "recipes", which may include a set of configurations for multiple controller devices 150. By setting up a recipe, the user may advantageously simultaneously initiate deployment of selected configurations to many different controller devices 150. Such may be useful, for example, for configuring multiple parts of a production line to begin production of a particular type of widget.

XI. Example Operation Control System Using HMI Devices

Figure 11:
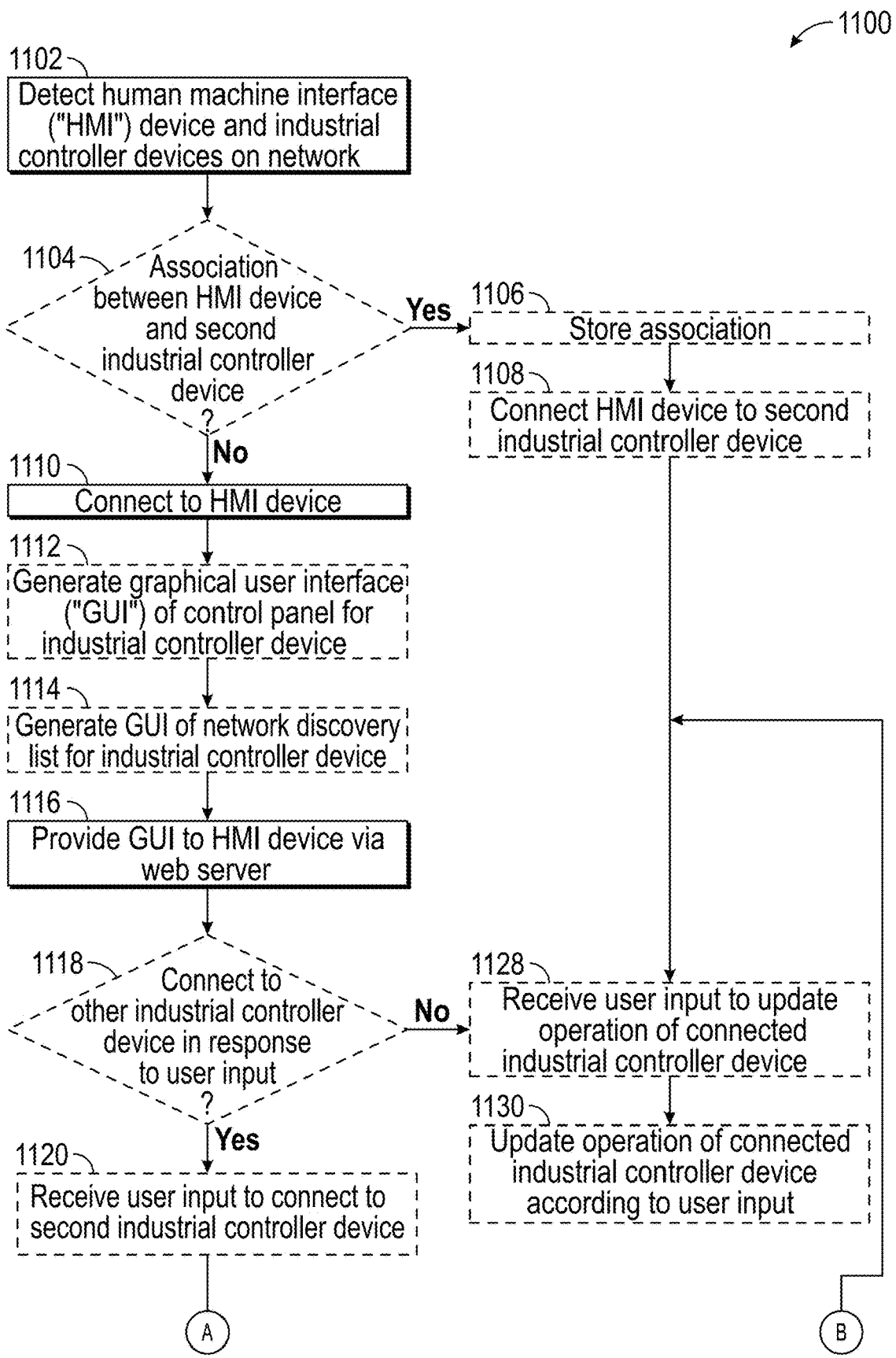
FIG. 11 is a flowchart illustrating example methods of configuring controller device operation via a human machine interface device, according to various embodiments of the present disclosure.
Figure 11:
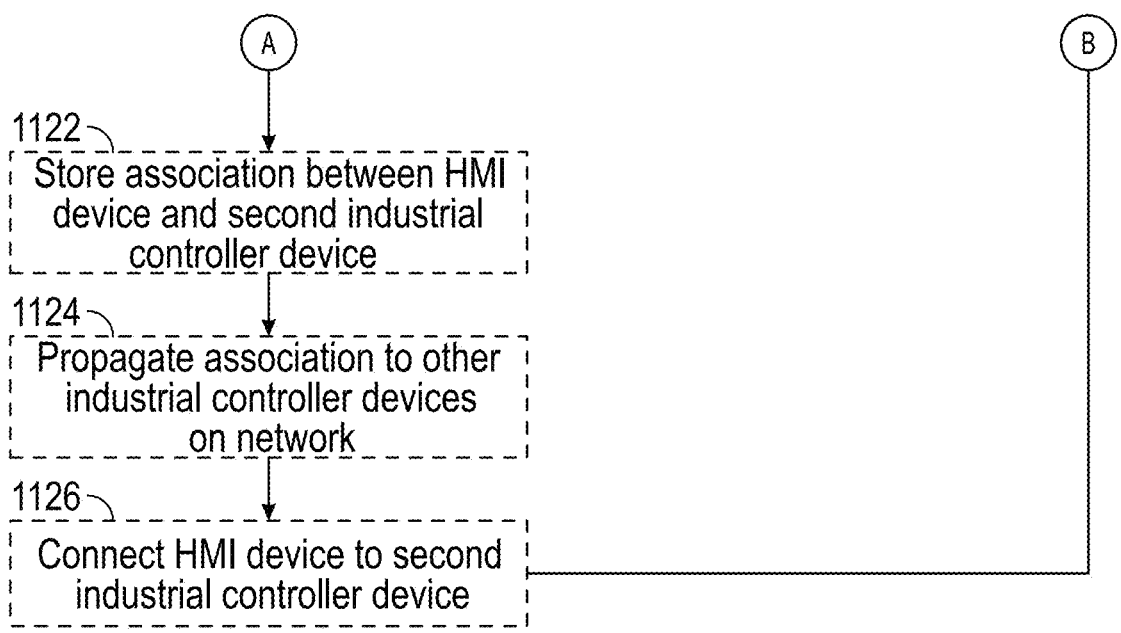

FIG. 11 is a flowchart illustrating example methods 1100 of configuring controller device operation via a human machine interface device, according to various embodiments of the present disclosure. FIG. 11 illustrates example functionality provided by, for example, the controller device(s) 150. The flowchart illustrates the method 1100 from the perspective of several controller devices connected to an industrial control system network. The industrial control system network may contain HMI devices, and various other devices specific to an organization as well as third-party devices.

At block 1102, a first controller device may detect an HMI device and other controller devices connected to the network. The first controller device may be equipped with network discovery capabilities and, as such, may detect other devices, including other controller devices, connected to the network. The first controller device may receive from the network devices unique identification codes associated with the other controller devices, such as, but not limited to, IP addresses. The first controller device may further receive from the devices device keys that indicate whether the devices belong in the same organization as the first controller device. The first controller device may then store the unique identification codes locally in one or more computer readable storage mediums 330, and/or transfer the information to a devices database 254 in a management device 230. In some embodiments, the first controller device may only store the unique identification codes for devices identified as belonging to the same organization as the first controller device.

At decision block 1104, the first controller device may determine whether the detected HMI device has a stored association with another, second controller device. The controller device may make this determination by accessing a whitelist of IP addresses (or other unique device identifiers) associated with HMI devices which have previously connected to the network. The whitelist may also include association data indicating to which controller device the HMI device connected previously. The whitelist may be stored in the computer readable storage medium(s) 330 and/or the devices database 254. In some embodiments, the first controller device may communicate with other controller devices or management devices 230 on the network to obtain the whitelist information. Further description related to generation and propagation of the whitelist across the network is described below, at blocks 1122 and 1124. If the HMI device has a stored association with a second controller device, the first controller device may cause the HMI device to connect to the second controller device. The method 1100 may then proceed to block 1106. If the HMI device does not have a stored association with another controller device, the first controller device may connect to the HMI device. The method 1100 may then proceed to block 1110.

At block 1106, the first controller device may store in one or more computer readable storage mediums 330 the association data between the HMI device and the second controller device, if the association data was not previously stored locally on the first controller device. Storing the association data locally on the controller device may improve future connection speed and efficiency if the HMI device disconnects from the network and later reconnects. If the HMI device connects to the first controller device again upon reconnection to the network, the first controller device can connect the HMI device to the second controller device without requesting whitelist data from other controller devices or management devices 230. At block 1108, the first controller device may connect the HMI device to the second controller device, or cause the HMI device to connect to the second controller device. Once re-connected to the HMI device, the second controller device may then receive user inputs for operation updates. Further description related to updating controller operation according to user input is described below, at blocks 1128 and 1130.

At block 1110, the first controller device may connect to the HMI device.

At block 1112, the first controller device may generate a graphical user interface depicting the first controller device's operation control panel. Further description related to generation of the controller device operation control panel interface is described below, in reference to FIG. 14. At block 1114, the first controller device may generate a graphical user interface depicting the connected controller device's network discovery list. Further description related to generation of the controller device network discovery list interface is described below, in reference to FIG. 13.

At block 1116, the first controller device may provide one or more of the generated interactive graphical user interfaces to the HMI device via a web server. The interactive graphical user interfaces may include, for example, the first controller device's network discovery list or the first controller device's operation control panel. In some embodiments, the user of the HMI device may be able to toggle and/or navigate among various graphical user interfaces provided by the controller device. The graphical user interfaces may be displayed in a web browser executing on the HMI device.

At decision block 1118, the first controller device may receive user input with instructions to connect the HMI device to another, second controller device. The first controller device may receive the user input via the HMI device. If the first controller device does not receive instructions to connect the HMI device to a second controller device, the first controller may maintain the connection to the HMI device, display its operation control panel, and receive user inputs for operation updates, for example. Further description related to updating controller operation according to user input is described below, at blocks 1128 and 1130. In some embodiments, the first controller device may also store the association data between the HMI device and the first controller device, as described in block 1106. In some embodiments, the first controller device may also communicate the association data to other controller devices or management devices 230 on the network to share the whitelist information. Further description related to generation and propagation of the whitelist across the network is described below, at blocks 1122 and 1124. The method may then proceed to block 1128. If the first controller device receives instructions to connect the HMI device to a second controller device, the first controller device may collect user input specifying the second controller device to which the HMI device should connect. The method may then proceed to block 1120.

It should be noted that the second controller device described in block 1120 need not be the same device as the second controller device described in block 1108. The term, as used herein, is merely in reference to a controller device which may connect to the HMI device, and which is not the first controller device.

At block 1120, the first controller device may receive user input, via the HMI device, specifying the second controller device to which the HMI device should connect. The user may select the second controller device from the network discovery list generated at block 1114. For example, the user may select the second controller device by touching a graphic on the network discovery list interface or using a cursor to click on the graphic. Further description related to an interactive graphical user interface for a controller device network discovery list is described below, in reference to FIG. 13.

At block 1122, the first controller device may store association data which indicates a connection between the HMI device and the second controller device. The first controller device may store the association data locally in one or more computer readable storage mediums 330, and/or transfer the information to a devices database 254 in a management device 230. The first controller device may also prompt the second controller device to store the association data. The association data may include identifying information for the HMI device, such as, but not limited to, a device serial number or IP address. The association data and HMI device identifying information may be added to a whitelist for more efficient network re-connection, as described at block 1104.

At block 1124, the first controller device may propagate the association data to at least one other industrial controller device on the network. In some embodiments, the association data may be propagated directly to individual controller devices, where each controller device may store the association data locally in one or more computer readable storage mediums 330. In some embodiments, the association data may be communicated to a devices database 254 in a management device 230 and each controller device connected to the network may access the devices database 254. In some embodiments, the first controller device may propagate the association data in both manners.

At block 1126, the first controller device may connect the HMI device to the second controller device, and/or cause the HMI device to connect to the second controller device, as specified by the user.

At block 1128, the controller device connected to the HMI device may receive user input, via the HMI device, updating operation of the connected controller device. The user may select a command from the operation control panel generated at block 1112. The user may select the second controller device by touching the graphic on the interface or using a cursor to click on the graphic. Further description related to an interactive graphical user interface for a controller device operation control panel is described below, in reference to FIG. 14. At block 1130, upon receipt of the user input, the controller device may update its operation according to the user input.

Figure 12:
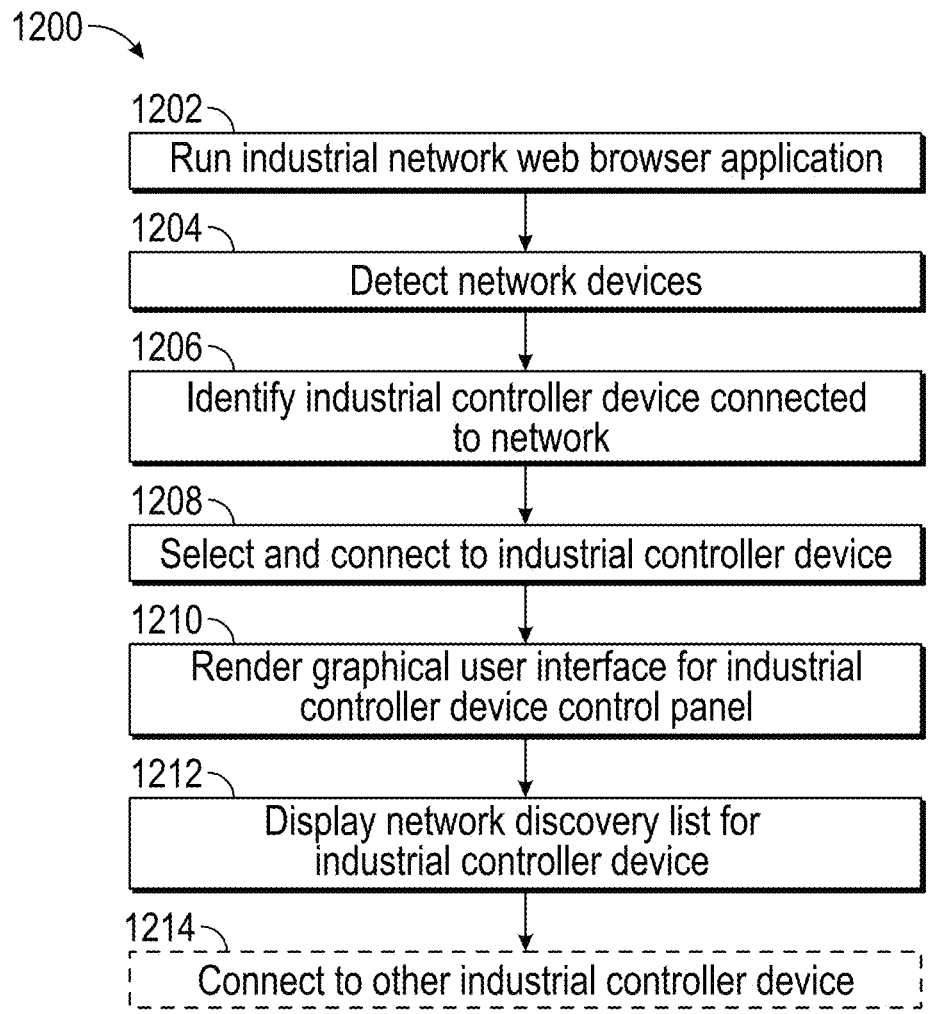
FIG. 12 is a flowchart illustrating example methods of connecting a human machine interface device to a controller device, according to various embodiments of the present disclosure.

FIG. 12 is a flowchart illustrating example methods 1200 of connecting an HMI device to a controller device, according to various embodiments of the present disclosure. FIG. 12 illustrates example functionality provided by, for example, the human machine interface device(s) 170. The flowchart illustrates the example method 1200 from the perspective of an HMI device accessing an industrial control system network.

At block 1202, the HMI device may run a pre-loaded web browser application configured specifically to connect to and control devices on the industrial control system network. In some embodiments, the web browser application may only display graphical user interfaces for an industrial controller device network discovery list or a controller device operation control panel. In some embodiments, the web browser application may include all the functions of a typical web browser but may be configured to automatically connect to the industrial control system and display a control system graphical user interface upon start-up.

At block 1204, the HMI device may detect other devices connected to the network. The network detection feature may be a feature of the HMI device, or the network detection feature may be a feature programmed into the web browser application. In some embodiments, the HMI device may only detect devices that belong to the same organization. The HMI device may identify devices belonging to the same organization through device keys, serial numbers, or other identifier data which indicates that a device belongs to an organization.

At block 1206, the HMI device may, from the list of detected devices, identify an industrial controller device in the organization. The HMI device may identify the controller device through a device key, serial number, or other identifier data which indicates that a device is an industrial controller device. At block 1208, the HMI device may connect to the detected industrial controller device. In some embodiments, the HMI device may connect to the first controller device detected. In other embodiments, the HMI device may simultaneously identify several controller devices and may connect to a randomly selected controller device. In other embodiments, the HMI device may connect to one of a plurality of detected controller devices based on various criteria, such as, for example, based on an ordering of IP address and/or unique identifiers associated with the controller devices, based on keys, names, or other identifiers associated with the controller devices, and/or the like.

At block 1210, the HMI device may render an interactive graphical user interface for an operation control panel for the connected controller device. Further description related to generation of the controller device operation control panel interface is described below, in reference to FIG. 14. A user of the HMI device may, via the graphical user interface, update operations for the controller device. At block 1212, the HMI device may render an interactive graphical user interface for a network discovery list for the connected controller device. Further description related to generation of the controller device network discovery list interface is described below, in reference to FIG. 13. A user of the HMI device may, via the graphical user interface, update view other network devices and connect the HMI to another network device.

At block 1214, the HMI device may connect to another industrial controller device according to user input. A user may select, via the network discovery list, a network device to which the HMI device may connect. Upon connection to the other controller device, the HMI device may render graphical user interfaces generated by the other controller device.

It should be understood that the methods described in FIGS. 11 and 12 are merely illustrative of the HMI device connection and controller device operation control processes, and are not indicative of scale for the methods. The foregoing methods may be scalable, and thus, include more than the example single HMI device and two controller devices shown in the figures. The foregoing methods may be performed on an industrial control system network containing any number of HMI devices and controller devices. Each network device may communicate with any other device on the network to achieve the tasks described above (e.g., propagating device associations, transmitting operation control commands, displaying network discovery lists, etc.). Each network device may further communicate live status updates and/or actions with other devices on the network such that all network devices contain uniform data regarding the network and associated devices.

Figure 13:
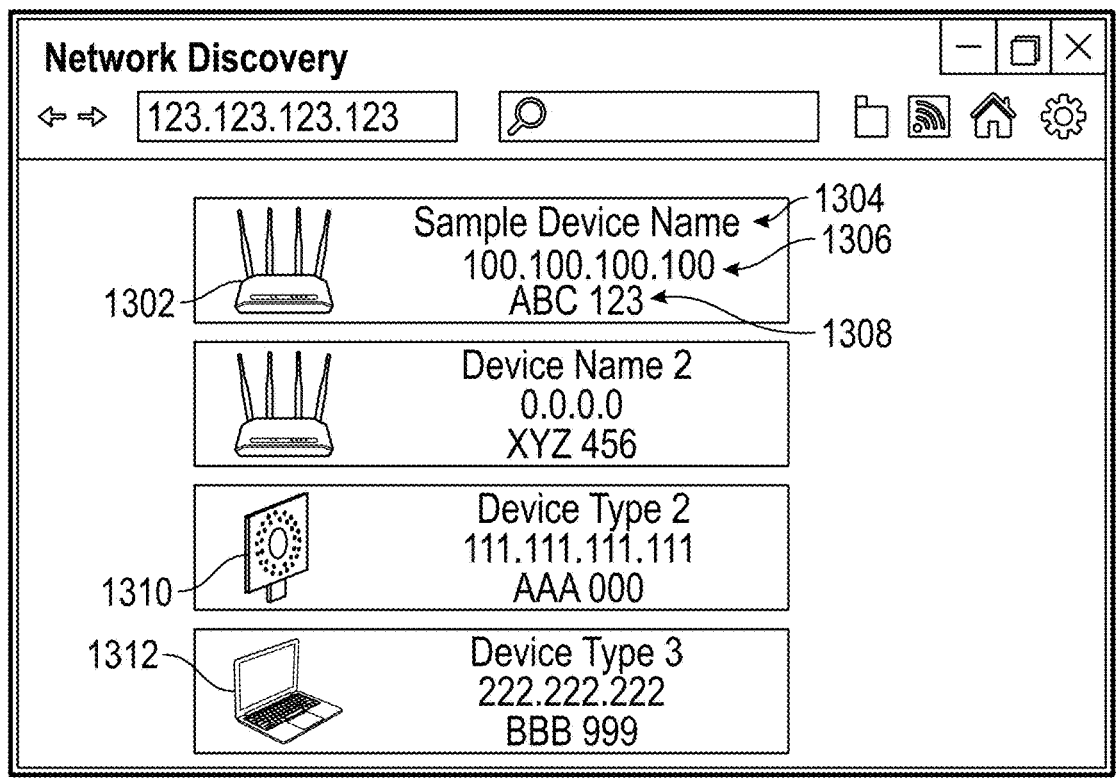
FIG. 13 illustrates an example interactive graphical user interface related to network discovery, according to various embodiments of the present disclosure.
Figure 14:
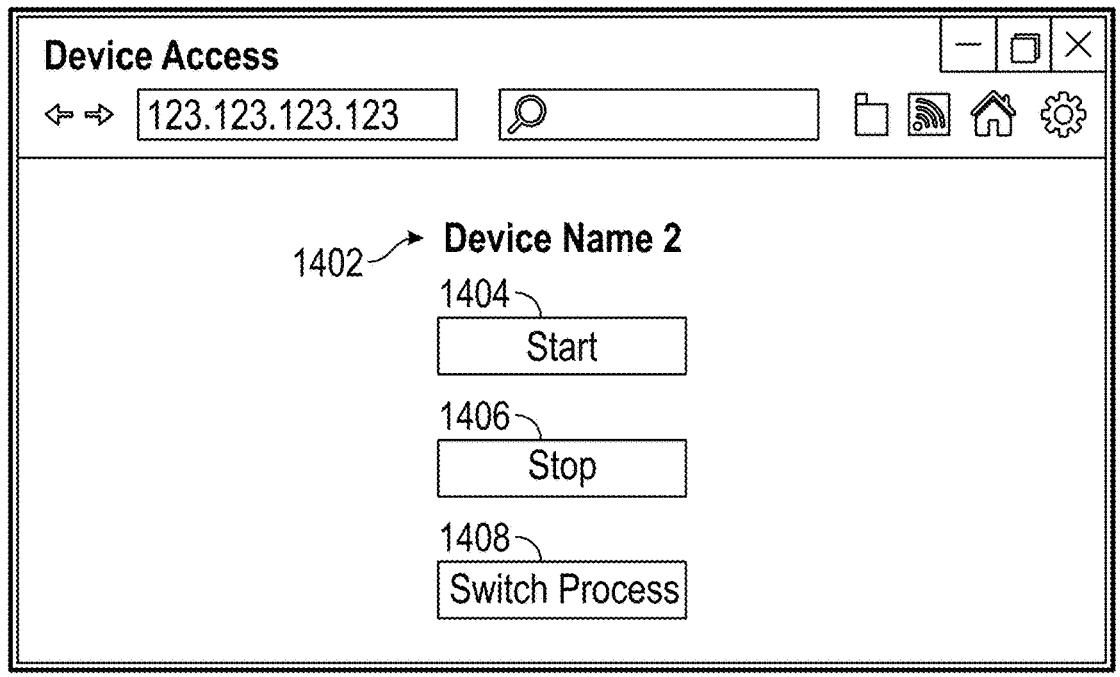
FIG. 14 illustrates an example interactive graphical user interface related to operation control of controller devices, according to various embodiments of the present disclosure.

FIGS. 13-14 illustrate example interactive graphical user interfaces related to network discovery and network device control, according to various embodiments of the present disclosure. The interactive graphical user interfaces of FIGS. 13-14 may be provided by a controller device executing a web server, as described herein, and may be accessible via HMI device(s) 170. The interactive graphical user interfaces may be transmitted to HMI devices via a web server of the controller device(s) 150, and may be rendered via a web browser on an HMI device, for example. In various embodiments, the interactive graphical user interfaces may be relatively streamlined. For example, the graphical user interfaces may comprise relatively few large buttons. In general, network discovery data and network device data are automatically gathered from multiple controller devices 150 and transmitted to the HMI device as described. Typically, the graphical user interfaces provided are specific to an organization, a production line, a manufacturing facility, and/or the like, and may include information from multiple controller devices 150.

FIG. 13 illustrates an example interactive graphical user interface related to network discovery, according to various embodiments of the present disclosure. The network discovery list 1300 may be configured to only list devices that are associated with the organization. The controller device may determine whether a device is associated with the organization via an identification code (e.g. a device key, serial number, etc.) unique to devices associated with the organization. The network discovery list 1300 may be designed for simplicity, and as such, may only list key identification information so users may easily recognize the device on the list and may use large and intuitive graphics. In some embodiments, the network discovery list 1300 may display detected network devices on one web browser page, such that the user may scroll down the page to see more devices. In other embodiments, the network discovery list 1300 may display detected network devices across several web browser pages, such that the user may view more devices by selecting a button on each web browser page, which may cause the graphical user interface to render other pages with more network devices.

Continuing with FIG. 13, the network discovery list 1300 may depict each network device with a graphic 1302/1310/1312, a device name 1304, an IP address 1306, and/or a serial number 1308. In some embodiments, the graphic 1302/1310/1312 may be a pre-loaded image that resembles the device hardware. The same pre-loaded image may be used for all network devices of a given type. The controller device may determine the type of a network device via a unique identification code (e.g. a device key, serial number, etc.) associated with each device. If no graphics are pre-loaded for a type of device, the network discovery list 1300 may show a blank space, an icon that indicates the device is of an unrecognized type, and/or a device icon that indicates a computing device without specificity. In some embodiments, the network discovery list 1300 may how network devices that are not associated with the organization. In such cases, a general device icon may be used to signify a non-organization computing device. The device name 1304 may be a descriptive name (as opposed to a technical identifier, such as an IP address) for easier identification by a user. The device serial number 1308 may be any length and may include any combination of characters, numbers, and/or symbols. It should be understood that FIG. 13 is merely an illustrative example and that the network discovery list 1300 may list a different combination of identification information, omitting some elements depicted in the illustration and/or including other elements not depicted in the illustration. The network discovery list 1300 may be displayed in any web browser.

Upon receipt of user instruction to connect to another device, the controller device may connect the HMI device to the selected device, and/or the HMI device may then connect to the selected device. The user may select a device by touching the graphic on the interface or using a cursor to click on the button. Once the HMI device connects to the selected device, the new controller device may generate and transmit for display an interactive graphical user interface for its network discovery list or operation control panel.

FIG. 14 illustrates an example interactive graphical user interface related to operation control of controller devices, according to various embodiments of the present disclosure. The operation control panel 1400 may be displayed on the HMI device via a web browser. The operation control panel 1400 may be designed for simplicity and intuitiveness, and as such, may be free from most or all non-essential elements. The operation control panel 1400 may display the device name 1402 of the controller device being controlled. The device name 1402 may be a descriptive name (as opposed to a technical identifier, such as an IP address) for easier identification by a user. The operation control panel 1400 may have a start button 1404, stop button 1406, and/or a switch process button 1408. The controller device may receive a command from the HMI device corresponding to the button that the user selects. The user may select a button by touching the graphic on the interface or using a cursor to click on the button. In some embodiments, each button may change the functioning of the controller device without further action. In some embodiments, each button may open a new web browser page, call a pop-up window, or otherwise trigger a graphical user interface change which prompts for confirmation or further details about the user's selection. The device name 1402 and the buttons may all be in displayed in large font, located in prominent locations on the graphical user interface, or otherwise be easily and quickly seen and understood. In some embodiments, the operation control panel 1400 may include a button to display the controller device's network discovery list 1300, where users may view and connect to other network devices belonging in the same organization. The operation control panel 1400 may be displayed in any web browser.

XII. Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. An industrial controller device comprising:
    a computer readable storage medium having program instructions embodied therewith; and
    one or more processors configured to execute the program instructions to cause the industrial controller device to:
        execute a network discovery service configured to detect and identify other devices on a network;
        execute, by the industrial controller device, a web server configured to generate one or more graphical user interfaces; and
        upon connection of a human machine interface ("HMI") device to the industrial controller device, provide to the HMI device, via the web server executed by the industrial controller device, at least a first graphical user interface of the one or more graphical user interfaces.

2. The industrial controller device of claim 1, wherein the one or more processors are configured to execute the program instructions to further cause the industrial controller device to:
    store an association between the HMI device and the industrial controller device; and
    propagate, to the other devices on the network, the association between the HMI device and the industrial controller device.

3. The industrial controller device of claim 1, wherein the one or more processors are configured to execute the program instructions to further cause the industrial controller device to:
    receive, from another device on the network, an association between the HMI device and a second device of the other devices on the network;
    store the association between the HMI device and the second device; and
    upon re-connection of the HMI device to the industrial controller device, cause the HMI device to connect to the second device.

4. The industrial controller device of claim 1, wherein the one or more processors are configured to execute the program instructions to further cause the industrial controller device to:
    in response to a user selection, via a second graphical user interface of the one or more graphical user interfaces, of a second device, of the other devices on the network, cause the HMI device to connect to the second device.

5. The industrial controller device of claim 4, wherein the first graphical user interface includes options for updates to operation of the industrial controller device, and wherein the second graphical user interface includes indications of the other devices on the network.

6. The industrial controller device of claim 5, wherein the second graphical user interface includes at least one of: indications of types of the other devices, or indications of names of the other devices.

7. The industrial controller device of claim 1, wherein the HMI device is configured with a web browser and a network discovery service, and wherein the HMI device is configured to, upon connection of the HMI device to the network:
    automatically detect any industrial controller devices on the network;
    automatically connect to a randomly selected one of the detected industrial controller devices; and
    via the web browser, render a graphical user interface provided by a web server of the randomly selected one of the detected industrial controller devices.

8. The industrial controller device of claim 1, wherein the one or more processors are configured to execute the program instructions to further cause the industrial controller device to:
    receive, via the first graphical user interface and the web server, a user input to update operation of the industrial controller device; and
    update operation of the industrial controller device in response to receiving the user input.

9. A method of network discovery for industrial controller system configuration, the method comprising:
    as implemented by an industrial controller device configured with specific program instructions,
        executing a network discovery service configured to detect and identify other devices on a network;
        executing, by the industrial controller device, a web server configured to generate one or more graphical user interfaces; and
        upon connection of a human machine interface ("HMI") device to the industrial controller device, providing to the HMI device, via the web server executed by the industrial controller device, at least a first graphical user interface of the one or more graphical user interfaces.

10. The method of claim 9, wherein the industrial controller device is configured with specific program instructions to further:
- store an association between the HMI device and the industrial controller device; and
- propagate, to the other devices on the network, the association between the HMI device and the industrial controller device.

11. The method of claim 9, wherein the industrial controller device is configured with specific program instructions to further:
- receive, from another device on the network, an association between the HMI device and a second device of the other devices on the network;
- store the association between the HMI device and the second device; and
- upon re-connection of the HMI device to the industrial controller device, cause the HMI device to connect to the second device.

12. The method of claim 9, wherein the industrial controller device is configured with specific program instructions to further:
- in response to a user selection, via a second graphical user interface of the one or more graphical user interfaces, of a second device, of the other devices on the network, cause the HMI device to connect to the second device.

13. The method of claim 12, wherein the first graphical user interface includes options for updates to operation of the industrial controller device, and wherein the second graphical user interface includes indications of the other devices on the network.

14. The method of claim 13, wherein the second graphical user interface includes at least one of: indications of types of the other devices, or indications of names of the other devices.

15. The method of claim 9, wherein the HMI device is configured with a web browser and a network discovery service, and wherein the HMI device is configured to, upon connection of the HMI device to the network:
- automatically detect any industrial controller devices on the network;
- automatically connect to a randomly selected one of the detected industrial controller devices; and
- via the web browser, render a graphical user interface provided by a web server of the randomly selected one of the detected industrial controller devices.

16. The method of claim 9, wherein the industrial controller device is configured with specific program instructions to further:
- receive, via the first graphical user interface and the web server, a user input to update operation of the industrial controller device; and
- update operation of the industrial controller device in response to receiving the user input.

* * * * *